US011764854B2

(12) United States Patent
Raghavan et al.

(10) Patent No.: US 11,764,854 B2
(45) Date of Patent: Sep. 19, 2023

(54) COORDINATED BEAM REFINEMENT AND COORDINATED BEAM FAILURE RECOVERY

(71) Applicant: QUALCOMM INCORPORATED, San Diego, CA (US)

(72) Inventors: Vasanthan Raghavan, West Windsor Township, NJ (US); Junyi Li, Chester, NJ (US); Jung Ho Ryu, Fort Lee, NJ (US); Tianyang Bai, Somerville, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 94 days.

(21) Appl. No.: 16/949,986

(22) Filed: Nov. 23, 2020

(65) Prior Publication Data

US 2021/0175957 A1    Jun. 10, 2021

Related U.S. Application Data

(60) Provisional application No. 62/944,738, filed on Dec. 6, 2019.

(51) Int. Cl.
*H04B 7/08* (2006.01)
*H04W 16/28* (2009.01)
(Continued)

(52) U.S. Cl.
CPC .......... *H04B 7/088* (2013.01); *H04B 7/0626* (2013.01); *H04L 5/0051* (2013.01); *H04W 16/28* (2013.01);
(Continued)

(58) Field of Classification Search
CPC .............. H04W 74/0833; H04W 16/28; H04B 7/0626; H04B 7/0695; H04B 7/088
See application file for complete search history.

(56) References Cited

U.S. PATENT DOCUMENTS

2018/0288756 A1* 10/2018 Xia ..................... H04W 72/042
2018/0368126 A1   12/2018 Islam et al.
(Continued)

OTHER PUBLICATIONS

International Search Report and Written Opinion—PCT/US2020/062005—ISA/EPO—dated Apr. 12, 2021.

*Primary Examiner* — Derrick V Rose
(74) *Attorney, Agent, or Firm* — Haynes and Boone, LLP

(57) ABSTRACT

Wireless communications systems and methods related to coordinated beam refinement and coordinated beam failure recovery (BFR) in a wireless communication network are provided. A first wireless communication device communicates, with a second wireless communication device of a group of wireless communication devices, a communication signal using a first beam characteristic. The first wireless communication device receives, from the second wireless communication device, at least one of beam feedback information or a beam change request. The first wireless communication device transmits, to the group of wireless communication devices in response to the at least one of the beam feedback information or the beam change request, a beam configuration indicating a second beam characteristic to be used by the group of wireless communication devices for communicating with the first wireless communication device, the second beam characteristic being different from the first beam characteristic.

30 Claims, 9 Drawing Sheets

(51) Int. Cl.
　　　*H04W 76/19*　　(2018.01)
　　　*H04B 7/06*　　　(2006.01)
　　　*H04W 74/08*　　(2009.01)
　　　*H04L 5/00*　　　(2006.01)

(52) U.S. Cl.
　　　CPC ....... *H04W 74/0833* (2013.01); *H04W 76/19* (2018.02)

(56) References Cited

U.S. PATENT DOCUMENTS

| | | | |
|---|---|---|---|
| 2019/0053312 A1 | 2/2019 | Xia et al. | |
| 2019/0335429 A1* | 10/2019 | Takeda | H04B 7/0695 |
| 2020/0029297 A1* | 1/2020 | Baek | H04W 76/11 |
| 2020/0413469 A1* | 12/2020 | Wu | H04B 7/0695 |
| 2021/0058131 A1* | 2/2021 | Zhu | H04B 7/0408 |

* cited by examiner

COORDINATED BEAM REFINEMENT AND COORDINATED BEAM FAILURE RECOVERY

CROSS REFERENCE TO RELATED APPLICATIONS

The present application claims priority to and the benefit of U.S. Provisional Patent Application No. 62/944,738, filed Dec. 6, 2019, which is hereby incorporated by reference in its entirety as if fully set forth below and for all applicable purposes.

TECHNICAL FIELD

This application relates to wireless communication systems, and more particularly to coordinated beam refinement and coordinated beam failure recovery (BFR) in a wireless communication network.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as mmWave bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

While high frequency bands, such as mmWave bands, can provide a higher data throughput than lower frequency bands, the path-loss can be high. To overcome the high path-loss, BSs and UEs may use beamforming to form directional beams for communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication, including communicating, by a first wireless communication device with a second wireless communication device of a group of wireless communication devices, a communication signal using a first beam characteristic; receiving, by the first wireless communication device from the second wireless communication device, at least one of beam feedback information or the beam change request; and transmitting, by the first wireless communication device to the group of wireless communication devices in response to the at least one of the beam feedback information or the beam change request, a beam configuration indicating a second beam characteristic to be used by the group of wireless communication devices for communicating with the first wireless communication device, the second beam characteristic being different from the first beam characteristic.

In an additional aspect of the disclosure, an apparatus including a transceiver configured to communicate, with a first wireless communication device of a group of wireless communication devices, a communication signal using a first beam characteristic; receive, from the first wireless communication device, at least one of beam feedback information or a beam change request; and transmit, to the group of wireless communication devices in response to the at least one of the beam feedback information or the beam change request, a beam configuration indicating a second beam characteristic to be used by the group of wireless communication devices for communicating with the apparatus, the second beam characteristic being different from the first beam characteristic.

In an additional aspect of the disclosure, a non-transitory computer-readable medium having program code recorded thereon, the program code including code for causing a first wireless communication device to communicate, with a second wireless communication device of a group of wireless communication devices, a communication signal using a first beam characteristic; code for causing the first wireless communication device to receive, from the second wireless communication device, at least one of beam feedback information or a beam change request; and code for causing the first wireless communication device to transmit, to the group of wireless communication devices in response to the at least one of the beam feedback information or the beam change request, a beam configuration indicating a second beam characteristic to be used by the group of wireless communication devices for communicating with the first wireless communication device, the second beam characteristic being different from the first beam characteristic.

In an additional aspect of the disclosure, an apparatus including means for communicating, with a first wireless communication device of a group of wireless communication devices, a communication signal using a first beam characteristic; means for receiving, from the first wireless communication device, at least one of beam feedback information or a beam change request; and means for transmitting, to the group of wireless communication devices in response to the at least one of the beam feedback information or the beam change request, a beam configuration indicating a second beam characteristic to be used by the group of wireless communication devices for communicating with the apparatus, the second beam characteristic being different from the first beam characteristic.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
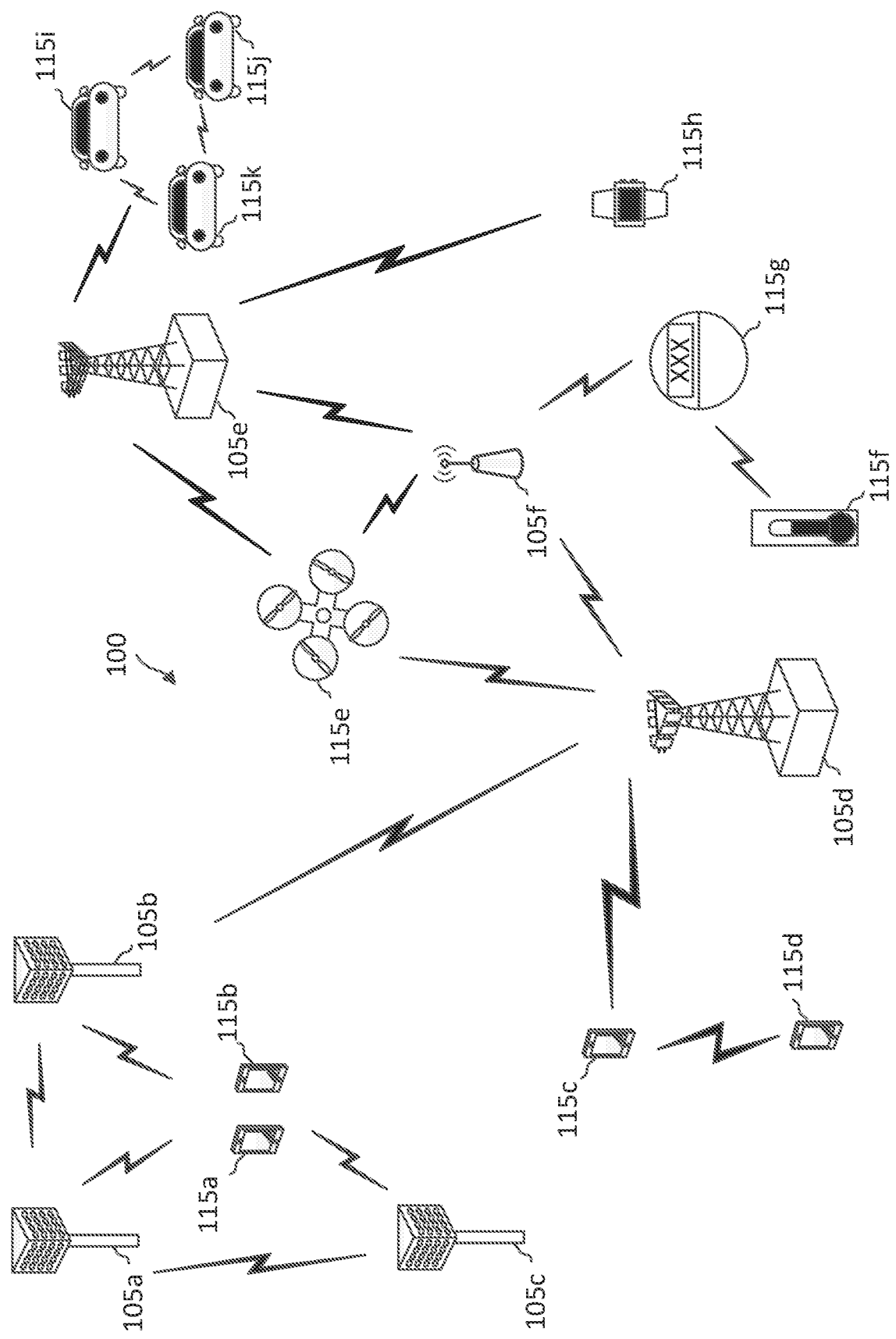
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

A wireless communication network may operate over a high frequency band, such as a mmWave band, to provision for a high data throughput. To overcome the high path-loss in the high frequency band, a base station (BS) may transmit reference signals and/or synchronization signal blocks (SSBs) in different beam directions, for example, by sweeping across a set of predefined beam directions. The BS may repeat the transmissions of the reference signals and/or SSBs in the different beam directions to allow a user equipment (UE) to perform signal measurements. The UE may report the measurements to the BS. The BS and the UE may select a best beam direction among the set of beam directions for subsequent communications. In some instances, the initially selected beam direction may not be optimal or the channel condition may change, and thus the BS and the UE may perform a beam refinement procedure to refine a beam selection. For instance, the initial selected beam may have a wide beamwidth for a broad coverage area and the beam refinement procedure may select a narrower beam in the initially selected direction. The narrower beam may cover a smaller geographical area, but may provide a higher transmission gain. The narrow beam with the higher gain can provide a higher signal-to-noise ratio (SNR) than the wide beam. In some instances, the channel condition may degrade and/or the UE may move out of a coverage of a currently selected beam, and thus the UE may detect a radio link failure, which may be referred to as a beam failure. Upon detecting a beam failure, the UE may perform a beam failure recovery (BFR) procedure with the BS to request for communication over a different beam direction.

The initial beam selection or beam acquisition, beam refinement, and BFR are typically performed on a per UE-basis. In other words, the BS may perform the initial beam selection or beam acquisition, beam refinement, and BFR with each UE. While the per-UE initial beam selection beam acquisition, beam refinement, and BFR may allow the BS and a UE to select an optimal beam for communication, the control signaling overhead for per-UE beam selection or beam acquisition, beam refinement, and BFR can be large when a network includes a large number of nodes. For instance, a massive IoT network may include thousands of IoT nodes to tens of thousands of IoT nodes. Additionally, when each node (e.g., IoT node) may have a small data payload (e.g., tens of bytes of measurements and/or status reports) for transmission, for example, to a central entity (e.g., a next generation node B (gNB) or a transmission reception point (TRP), remote radio head (RRH), customer premises equipment (CPE), and/or BS), and the control signaling overhead associated with the beam refinement and/or BFR may be even more significant and can potentially impact the forwarding of the small-size data of the nodes.

The present application describes mechanisms for performing coordinated beam refinement and/or coordinated BFR with a group of nodes. For example, a BS may group multiple nodes (e.g., UEs or any wireless communication devices) into a group based on a correlated channel structure amongst the nodes. The correlated channel structure may refer to the large-scale channel properties such as path losses, penetration losses encountered with similar blockage objects such as building parts, machine parts, vehicles, humans, etc. between the nodes and the BS. The BS may select the nodes to form the group based on location/position information, beam feedback information, network configuration information, and/or environmental information associated with the nodes. The BS may communicate with the group of nodes using a first beam with a first beam characteristic (e.g., including a beam direction and/or a beamwidth). The BS may receive a beam refinement request from a node in the group and trigger a common beam refinement for all nodes in the group. Similarly, the BS may receive a BFR request from a node in the group and trigger a common BFR for all nodes in the group.

In some aspects, upon receiving a beam refinement request from a node in the group, the BS may configure the group of nodes with common channel state information-reference signal (CSI-RS) resources and corresponding beam characteristics (e.g., with a finer beam direction and/or better beamwidth granularity than the first beam). The BS may transmit CSI-RSs using the CSI-RS resources and corresponding beam characteristics. The nodes may report measurements (e.g., reference signal received power (RSRP) or reference signal received equality (RSRQ) or signal-to-noise ratio (SNR) or signal-to-interference and noise ratio (SINR)) for the CSI-RSs. The BS may select an optimal beam for the group of nodes based on the received CSI-RS reports from one or more nodes in the group. The selected beam may correspond to a beam providing a highest RSRP or a RSRQ or a SNR or a SINR at the group of nodes among a set of refined beams. The BS may configure the group of nodes to switch to the selected beam.

In some aspects, upon receiving a BFR request from a node in the group, the BS may respond with a BFR response. The BFR request may be a random access request (e.g., a physical random access channel signal (PRACH)) and the BFR response may be a random access response. For instance, the node detecting the beam failure may select another beam (e.g., based on RSRP or RSRQ or SNR or SINR measurements) and transmit the PRACH signal in the beam direction of the selected beam. The BS may transmit a random access response to the node in the beam direction where the BFR request is received. The random access response may indicate a successful BFR. The BS may configure other nodes in the group to switch to the beam selected by the node detecting the beam failure. Alternatively, in response to the BFR request, the BS may configure the group of nodes with common CSI-RS resources and corresponding beam characteristics, transmit CSI-RSs according to the CSI-RS configuration, receive measurement reports from the nodes, and select a beam for the BFR based on the measurement reports.

Aspects of the present disclosure can provide several benefits. For example, the performing of the beam refinement and/or the BFR on a per group-basis can reduce control signaling overhead compared to a per node-based beam refinement and/or BFR. The reduction in the control signaling overhead can be significant in a network, such as a massive IoT network with a massive number of IoT nodes (e.g., about 1000, 2000, 300 or more than 10,000). While the present disclosure is described in the context of a BS performing a group-based common beam refinement or a group-based common BFR, the present disclosure can be applied to device-to-device (D2D), vehicle-to-vehicle (V2V) and/or sidelink communications among UEs or peer nodes. For instance, a node may perform a group-based common beam refinement or a group-based common BFR with a group of peer nodes.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as vehicle-to-vehicle (V2V), vehicle-to-everything (V2X), cellular-V2X (C-V2X) communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using hybrid automatic repeat request (HARQ) techniques to improve communication reliability, for example, to provide an ultra-reliable low-latency communication (URLLC) service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ acknowledgement (ACK) to the BS 105. Conversely, if the UE 115 fails to receive the DL transmission successfully, the UE 115 may transmit a HARQ negative-acknowledgement (NACK) to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands or unlicensed frequency bands. For example, the network 100 may be an NR-unlicensed (NR-U) network. The BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel. In an example, the LBT may be based on energy detection. For example, the LBT results in a pass when signal energy measured from the channel is below a threshold. Conversely, the LBT results in a failure when signal energy measured from the channel exceeds the threshold. In another example, the LBT may be based on signal detection. For example, the LBT results in a pass when a channel reservation signal (e.g., a predetermined preamble signal) is not detected in the channel In some aspects, the network 100 may operate over a high frequency band, for example, in a frequency range 1 (FR1) band or a frequency range 2 (FR2) band. FR1 may refer to frequencies in the sub-6 GHz range and FR2 may refer to frequencies in the mmWave range. To overcome the high path-loss at high frequency, the BSs 105 and the UEs 115 may communicate with each other using directional beams. For instance, a BS 105 may transmit SSBs by sweeping across a set of predefined beam directions and may repeat the SSB transmissions at a certain time interval in the set of beam directions to allow a UE 115 to perform initial network access. In some instances, each beam and its corresponding characteristics may be identified by a beam index. For instance, each SSB may include an indication of a beam index corresponding to the beam used for the SSB transmission. The UE 115 may determine signal measurements, such as reference signal received power (RSRP) and/or reference signal received quality (RSRQ), for the SSBs at the different beam directions and select a best DL beam. The UE 115 may indicate the selection by transmitting a PRACH signal (e.g., MSG1) using PRACH resources associated with the selected beam direction. For instance, the SSB transmitted in a particular beam direction may indicate PRACH resources that may be used by a UE 115 to communicate with the BS 105 in that particular beam direction. After selecting the best DL beam, the UE 115 may complete the random access procedure (e.g., the 4-step random access or the 2-step random access) and proceed with network registration and normal operation data exchange with the BS 105. In some instances, the initially selected beams may not be optimal or the channel condition may change, and thus the BS 105 and the UE 115 may perform a beam refinement procedure to refine a beam selection. For instance, BS 105 may transmit CSI-RSs by sweeping narrower beams over a narrower angular range and the UE 115 may report the best DL beam to the BS 105. When the BS 105 uses a narrower beam for transmission, the BS 105 may apply a higher gain, and thus may provide a better performance (e.g., a higher signal-noise-ratio (SNR)). In some instances, the channel condition may degrade and/or the UE 115 may move out of a coverage of an initially selected beam, and thus the UE 115 may detect a beam failure condition. Upon detecting a beam failure, the UE 115 may perform a BFR with the BS 105 to request for communication over a different beam direction.

In some aspects, the network 100 may be an IoT network and the UEs 115 may be IoT nodes, such as smart printers, monitors, gaming nodes, cameras, audio-video (AV) production equipment, industrial IoT devices, and/or the like.

The transmission payload data size of an IoT node typically may be relatively small, for example, in the order of tens of bytes. In some aspects, the network 100 may be a massive IoT network serving tens of thousands of nodes (e.g., UEs 115) over a high frequency band, such as a FR1 band or a FR2 band. Mechanisms for performing beamforming and beam management in a massive IoT network or any network with a massive number of nodes (e.g., UEs 115) are described in greater detail herein.

Figure 2:
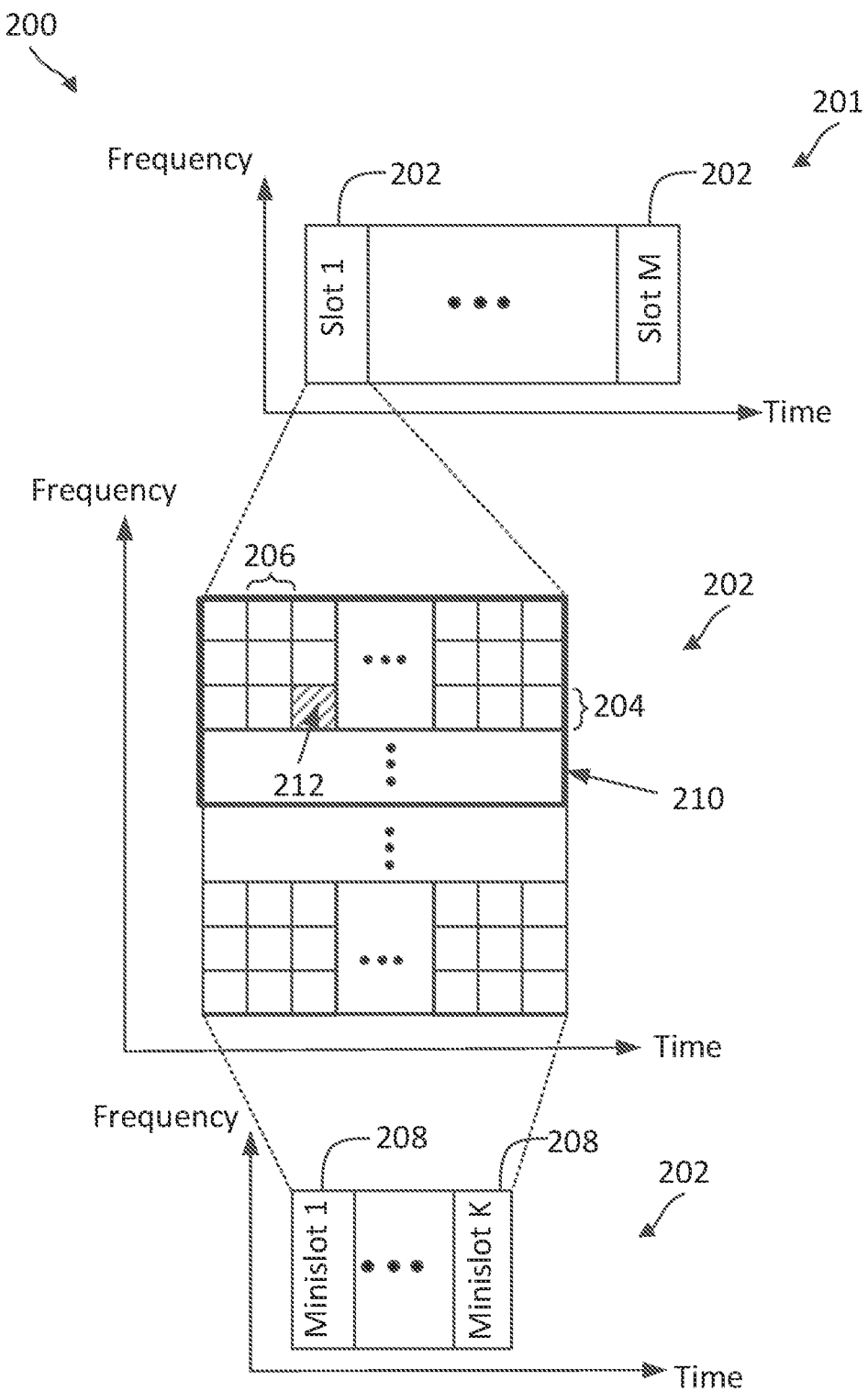
FIG. 2 illustrates a radio frame structure according to some aspects of the present disclosure.

FIG. 2 is a timing diagram illustrating a radio frame structure 200 according to some aspects of the present disclosure. The radio frame structure 200 may be employed by BSs such as the BSs 105 and UEs such as the UEs 115 in a network such as the network 100 for communications. In particular, the BS may communicate with the UE using time-frequency resources configured as shown in the radio frame structure 200. In FIG. 2, the x-axes represent time in some arbitrary units and the y-axes represent frequency in some arbitrary units. The radio frame structure 200 includes a radio frame 201. The duration of the radio frame 201 may vary depending on the aspects. In an example, the radio frame 201 may have a duration of about ten milliseconds. The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on the aspects, for example, based on the channel bandwidth, the subcarrier spacing (SCS), and/or the CP mode. One subcarrier 204 in frequency and one symbol 206 in time forms one resource element (RE) 212 for transmission. A resource block (RB) 210 is formed from a number of consecutive subcarriers 204 in frequency and a number of consecutive symbols 206 in time.

In an example, a BS (e.g., BS 105 in FIG. 1) may schedule a UE (e.g., UE 115 in FIG. 1) for UL and/or DL communications at a time-granularity of slots 202 or mini-slots 208. Each slot 202 may be time-partitioned into K number of mini-slots 208. Each mini-slot 208 may include one or more symbols 206. The mini-slots 208 in a slot 202 may have variable lengths. For example, when a slot 202 includes N number of symbols 206, a mini-slot 208 may have a length between one symbol 206 and (N−1) symbols 206. In some aspects, a mini-slot 208 may have a length of about two symbols 206, about four symbols 206, or about seven symbols 206. In some examples, the BS may schedule UE at a frequency-granularity of a resource block (RB) 210 (e.g., including about 12 subcarriers 204).

Figure 3:
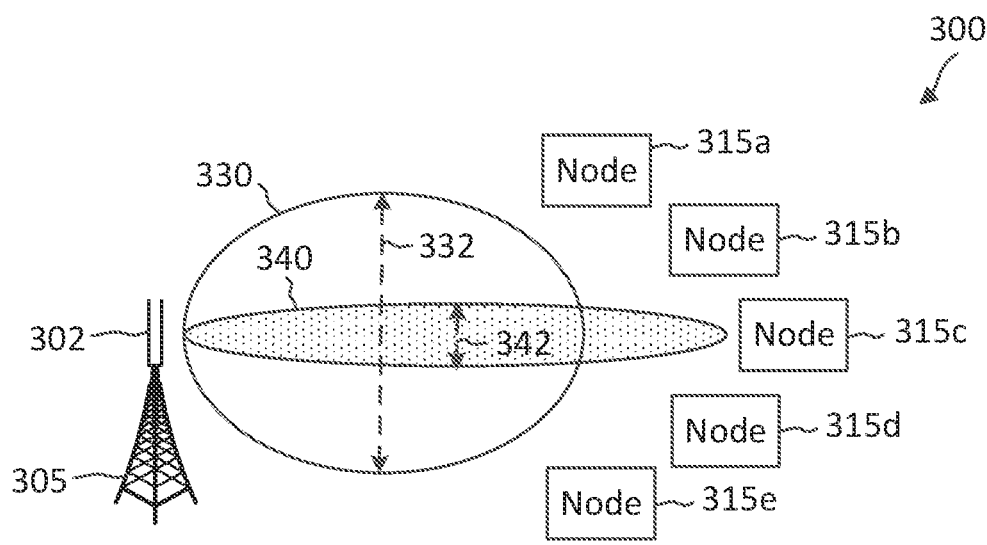
FIG. 3 illustrates a wireless communication network utilizing directional beams for communications according to some aspects of the present disclosure.

FIG. 3 illustrates a wireless communication network 300 utilizing directional beams for communications according to some aspects of the present disclosure. The network 300 may correspond to a portion of the network 100. FIG. 3 illustrates one BS 305 and five nodes 315 (shown as 315a, 315b, 315c, 315d, and 315e) for purposes of simplicity of discussion, though it will be recognized that aspects of the present disclosure may scale to many more BSs 305 and more or less nodes 315. The BS 305 may correspond to a BS 105 of the network 100 and the nodes 315 may correspond to UEs 115 of the network 100. The nodes 315 may be IoT nodes, such as smart printers, smart meters, monitors, gaming nodes, cameras, AV production equipment, industrial IoT devices, sensors, vehicles, and/or the like. The nodes 315 may collect data, measurements, statuses and report the data, measurements, and/or statuses to the BS 305. In some other instances, the nodes 315 may be CPEs. The BS 305 and the nodes 315 may communicate with each other over a sub-6 GHz band or a mmWave band using directional beams. In some instances, the BS 305 and/or the nodes 315 may use a small antenna array with a few number of antenna elements for beamforming for communication over a sub-6 GHz band, and may use a large number of antenna elements for beamforming for communication over a mmWave band. Additionally, the BS 305 and the nodes 315 may communicate with each other using the radio frame structure 200. Further, given the large bandwidth available at the high-frequency band, the BS 305 may communicate with the nodes 315 using frequency-division-multiplexing (FDM) instead of using time-division multiplexing (TDM).

In the illustrated example of FIG. 3, the nodes 315a-315e are located at geographical locations that are in close proximity to each other. The BS 305 may include an antenna array 302. The antenna array 302 may include a number of antenna elements that can be configured for beamforming to create directional beams. The BS 305 may configure the antenna array 302 to create a broad coverage beam 330 to cover as many nodes as possible. A broad coverage beam 330 refers to a beam with a wide beamwidth 332 that can cover a large geographical area. The beamwidth 332 may refer to the width of the main lobe (within 3 dB or 5 dB of the peak array gain as example illustrations) or main beam with a maximum radiated energy. For instance, the BS 305 may utilize the wide beam 330 to communicate with all the nodes 315a-315e. Since the antenna array 302 may deliver a limited amount of gain, a wider beam may have a lower gain (e.g., a lower peak gain) than a narrower beam. Alternatively, the BS 305 may configure the antenna array 302 to create a narrow coverage beam 340 to provide a higher gain (e.g., a higher peak gain). A narrow coverage beam 330 refers to a beam with a narrow beamwidth 342 that can cover a small geographical area. For instance, the narrow beam 340 may only cover the node 315c, but may provide a higher gain to the node 315c compared to the wide beam 330. Thus, when using narrow beams for communications, the BS 305 may create a different narrow beam (in a different beam direction) for communication with each node 315. In other words, in order to use narrow beams for the high gain, the BS 305 may communicate with each node 315 at a different time using different beams rather than communicating with all nodes 315a-315e at the same time using FDM with a wide beam. As such, there is a trade-off between transmission gain and beamwidth or coverage in order to take advantage of the large bandwidth.

Figure 4:
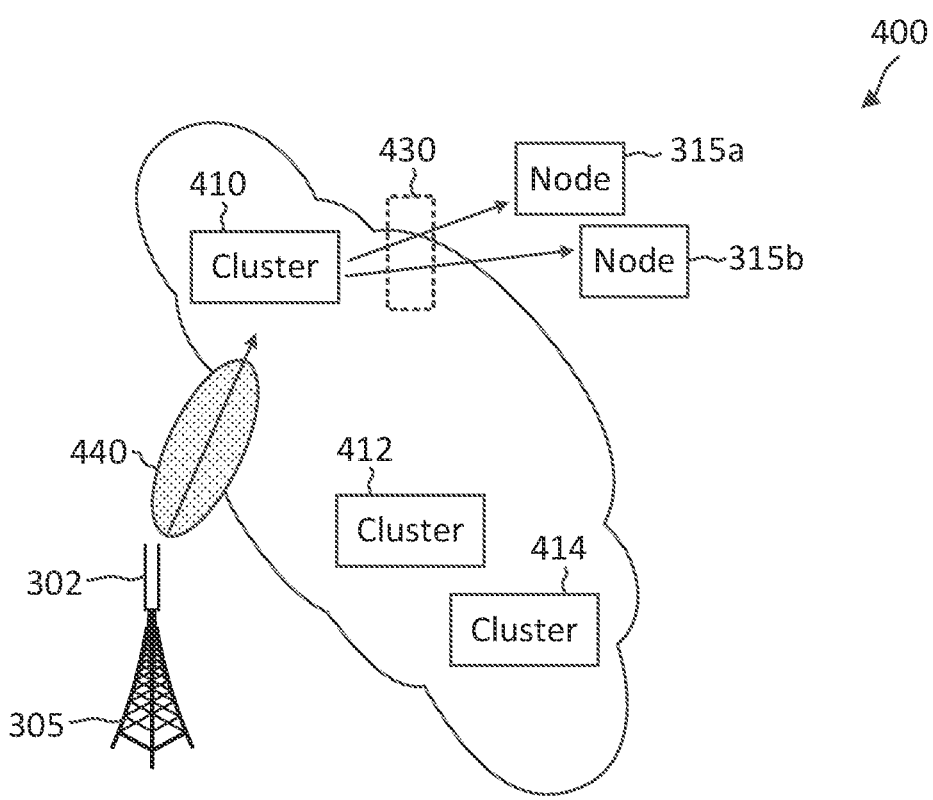
FIG. 4 illustrates a wireless communication scenario with directional beams according to some aspects of the present disclosure.

FIG. 4 illustrates a wireless communication scenario 400 with directional beams according to some aspects of the present disclosure. The scenario 400 may correspond to a communication scenario between the BS 305 and the nodes 315a and 315b in the network 300. In the illustrated example of FIG. 4, the scenario 400 includes multiple sets of clusters 410, 412, and 414 in an environment between the BS 305 and the nodes 315. The clusters 410, 412, 414 may include any objects which may function as reflectors, scatterers, and/or diffractors that contribute to a mmWave propagation path. Due to the close proximity of the geographical locations of the nodes 315a and 315b, the nodes 315a and 315b may experience a similar channel with the same set of dominant clusters. As shown, the clusters 410 may be a dominant set of clusters when the BS 305 uses a beam 440 to communicate with the nodes 315a and 315b. The clusters 412 and 414 may have different channel effects for the nodes 315a and 315b, but it may have little or no impact to the channel structure when the BS 305 uses the beam 440 for communications with the nodes 315a and 315b. In other words, the large-scale channel properties (e.g., path loss, penetration loss) experienced by the nodes 315a and 315b due to the clusters 410 may be substantially similar. It should be noted that while the BS 305 uses the same beam 440 for communications with the nodes 315a and 315b, the channel matrix between the BS 305 and the node 315a can be different from the channel matrix between the BS 305 and the node 315b. If the propagation paths between the BS 305 and the nodes 315 are blocked by a blocker 430, both nodes 315a and 315b may be blocked from communicating with the BS 305. In other words, the channel structure between the BS 305 and the node 315a is correlated with the channel structure between the BS 305 and the node 315b.

Accordingly, instead of performing beam refinement and/or BFR on a per UE-basis or per node-basis, the present disclosure provides techniques that leverage the correlated structure to perform common beam refinement and/or common BFR on a per group-basis.

Figure 5:
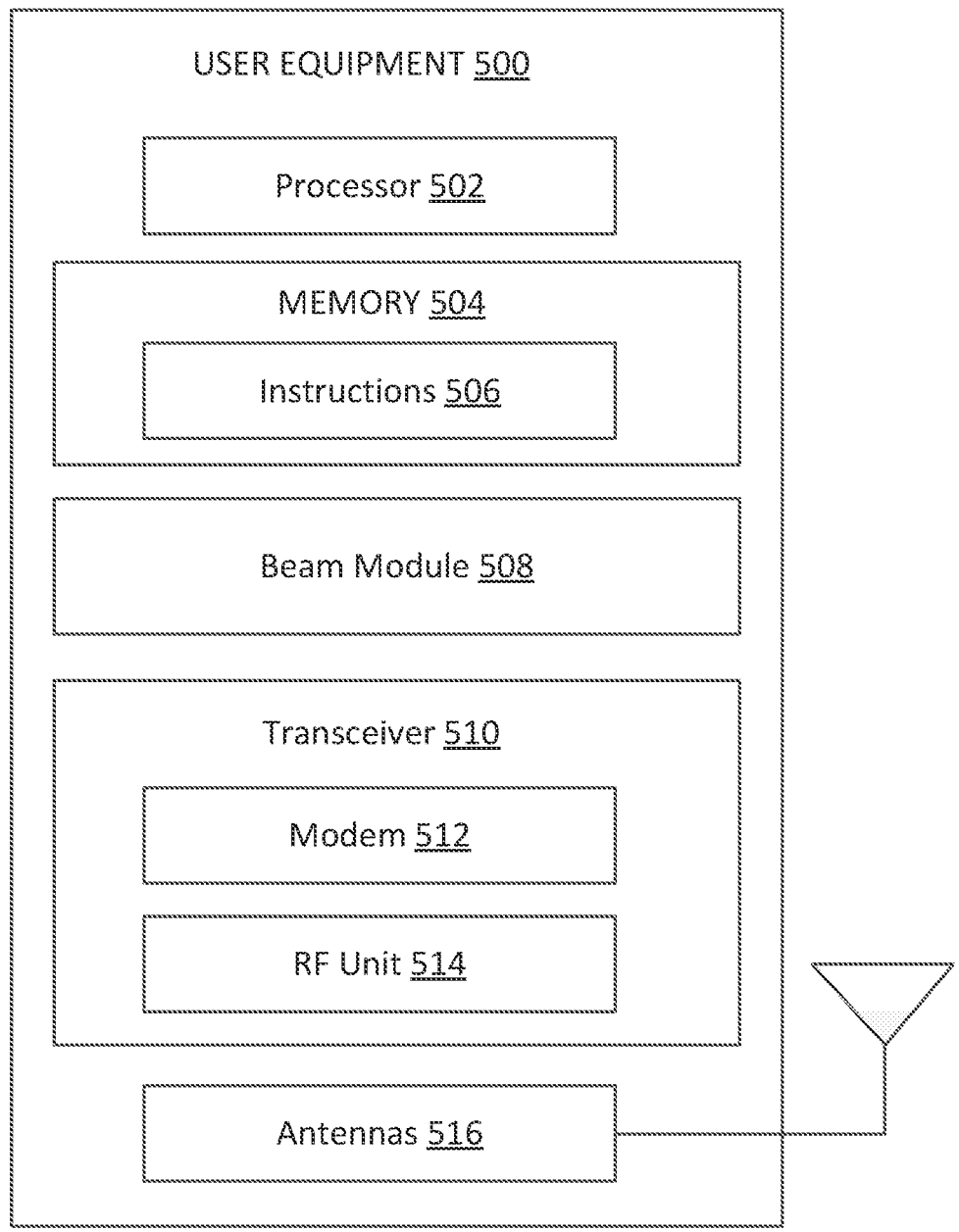
FIG. 5 is a block diagram of a user equipment (UE) according to some aspects of the present disclosure.

FIG. 5 is a block diagram of an exemplary UE 500 according to some aspects of the present disclosure. The UE 500 may be a UE 115 discussed above in FIG. 1 or a node 315 discussed above in FIGS. 3 and 4. As shown, the UE 500 may include a processor 502, a memory 504, a beam module 508, a transceiver 510 including a modem subsystem 512 and a radio frequency (RF) unit 514, and one or more antennas 516. These elements may be in direct or indirect communication with each other, for example via one or more buses.

The processor 502 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 504 includes a non-transitory computer-readable medium. The memory 504 may store, or have recorded thereon, instructions 506. The instructions 506 may include instructions that, when executed by the processor 502, cause the processor 502 to perform the operations described herein with reference to the UEs 115 in connection with aspects of the present disclosure, for example, aspects of FIGS. 2-4 and 7-10. Instructions 506 may also be referred to as program code. The program code may be for causing a wireless communication device to perform these operations, for example by causing one or more processors (such as processor 502) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The beam module 508 may be implemented via hardware, software, or combinations thereof. For example, the beam module 508 may be implemented as a processor, circuit, and/or instructions 506 stored in the memory 504 and executed by the processor 502. In some instances, the beam module 508 can be integrated within the modem subsystem 512. For example, the beam module 508 can be implemented by a combination of software components (e.g., executed by a DSP or a general processor) and hardware components (e.g., logic gates and circuitry) within the modem subsystem 512.

The beam module 508 may be used for various aspects of the present disclosure, for example, aspects of aspects of FIGS. 2-4 and 7-10. The beam module 508 is configured to receive SSBs from a BS (e.g., the BSs 105 and/or 305) in various beams directions, receive a CSI-RS resource configuration from the BS, receive a BFR resource configuration from the BS, receive CSI-RSs from various beam directions based in the CSI-RS resource configuration, determine beam measurements (e.g., RSRPs or RSRQs or SNRs or SINRs) for the received SSBs and/or CSI-RSs, report beam feedback information (e.g., including the measurements) to the BS, perform beam selection with the BS to select an optimal beam for communication with the BS, monitor beam measurements, request beam refinement, and/or request BFR when beam measurements fall below certain thresholds, receive a beam switch command from the BS, and/or perform a beam switch based on a beam switch command. In some aspects, beam module 508 is configured to configure the transceiver 510 to perform digital beam-forming and/or analog beamforming to generate reception beams in certain directions for receiving DL signals from the BS and/or to generate transmission beams in certain directions for transmitting UL signals to the BS.

In some aspects, the UE 500 may communicate with peer nodes (e.g., the UEs 115 and/or 315) over sidelinks or D2D links. In other words, the UE 500 may be a sidelink UE or a sidelink node. The beam module 508 is configured to perform a common beam refinement and/or a common BFR with a group of peer nodes. For instance, the beam module 508 is configured to group multiple nodes into a group based on a correlated channel structure among the nodes. The grouping of the nodes may be based on location information, beam feedback information, network configuration information, and/or environmental information associated with the nodes. The beam module 508 is configured to communicate with the group of nodes using a first beam with a first beam characteristic (e.g., including a beam direction and/or a beamwidth), receive a beam refinement request from a node in the group, trigger a beam refinement for all nodes in the group based on the received beam refinement request, receive a BFR request (e.g., a random access request) from a node in the group, and trigger a BFR for all nodes in the group based on the BFR request.

In some aspects, upon receiving a beam refinement request from a node in the group, the beam module 508 is configured to configure the group of nodes with common CSI-RS resources and corresponding beam characteristics (e.g., with a finer beam direction and/or beamwidth granularity than the first beam). The beam module 508 is further configured to transmit CSI-RSs using the CSI-RS resources and corresponding beam characteristics, receive beam measurements (e.g., RSRPs or RSRQs or SNRs or SINRs) from one or more mode nodes of the group of nodes, select an optimal beam for the group of nodes based on the received CSI-RS reports, and configure the group of nodes to switch to the selected second beam.

In some aspects, upon receiving a BFR request from a node in the group, the beam module 508 is configured to transmit a random access response to the node in the selected beam direction to indicate a successful BFR, and configure other nodes in the group to switch to the beam selected by the node detecting the beam failure. Alternatively, in response to the BFR request, the beam module 508 is configured to configure the group of nodes with common CSI-RS resources and corresponding beam characteristics, transmit CSI-RSs according to the CSI-RS configuration, receive measurement reports from the nodes, and select a beam for the BFR based on the measurement reports. Mechanisms for performing a group-based common beam refinement and/or a group-based common BFR are described in greater detail herein.

As shown, the transceiver 510 may include the modem subsystem 512 and the RF unit 514. The transceiver 510 can be configured to communicate bi-directionally with other devices, such as the BSs 105. The modem subsystem 512 may be configured to modulate and/or encode the data from the memory 504 and/or the beam module 508 according to a modulation and coding scheme (MCS), e.g., a low-density parity check (LDPC) coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data (e.g., PUCCH control information, PRACH signals, PUSCH data, beam refinement request, BFR request, beam switch command, reference signals) from the modem subsystem 512 (on outbound transmissions) or of transmissions originating from another source such as a UE 115 or a BS 105. The RF unit 514 may be further configured to perform analog beamforming in conjunction with the digital beamforming. Although shown as integrated together in transceiver 510, the modem subsystem 512 and the RF unit 514 may be separate devices that are coupled together at the UE 115 to enable the UE 115 to communicate with other devices.

The RF unit 514 may provide the modulated and/or processed data, e.g. data packets (or, more generally, data messages that may contain one or more data packets and other information), to the antennas 516 for transmission to one or more other devices. The antennas 516 may further receive data messages transmitted from other devices. The antennas 516 may provide the received data messages for processing and/or demodulation at the transceiver 510. The transceiver 510 may provide the demodulated and decoded data (e.g., SSBs, PDCCH, PDSCH, beam switch command, CSI-RS resource configuration, CSI-RS reporting configuration, BFR resource configuration) to the beam module 508 for processing. The antennas 516 may include multiple antennas of similar or different designs in order to sustain multiple transmission links. The RF unit 514 may configure the antennas 516.

In some aspects, the transceiver 510 is configured to communicate, with a second wireless communication device of a group of wireless communication devices, a communication signal using a first beam characteristic. The transceiver 510 is further configured to receive, from the second wireless communication device, at least one of beam feedback information or a beam change request. The transceiver 510 is further configured to transmit, to the group of wireless communication devices in response to the at least one of the beam feedback information or the beam change request, a beam configuration indicating a second beam characteristic to be used by the group of wireless communication devices for communicating with the first wireless communication device, where the second beam characteristic being different from the first beam characteristic. The transceiver 510 may coordinate with the beam module 508 for communicating the communication signal, receiving the at least one of the beam feedback information or the beam change request, and transmitting the beam configuration.

In an aspect, the UE 500 can include multiple transceivers 510 implementing different RATs (e.g., NR and LTE). In an aspect, the UE 500 can include a single transceiver 510 implementing multiple RATs (e.g., NR and LTE). In an aspect, the transceiver 510 can include various components, where different combinations of components can implement different RATs.

Figure 6:
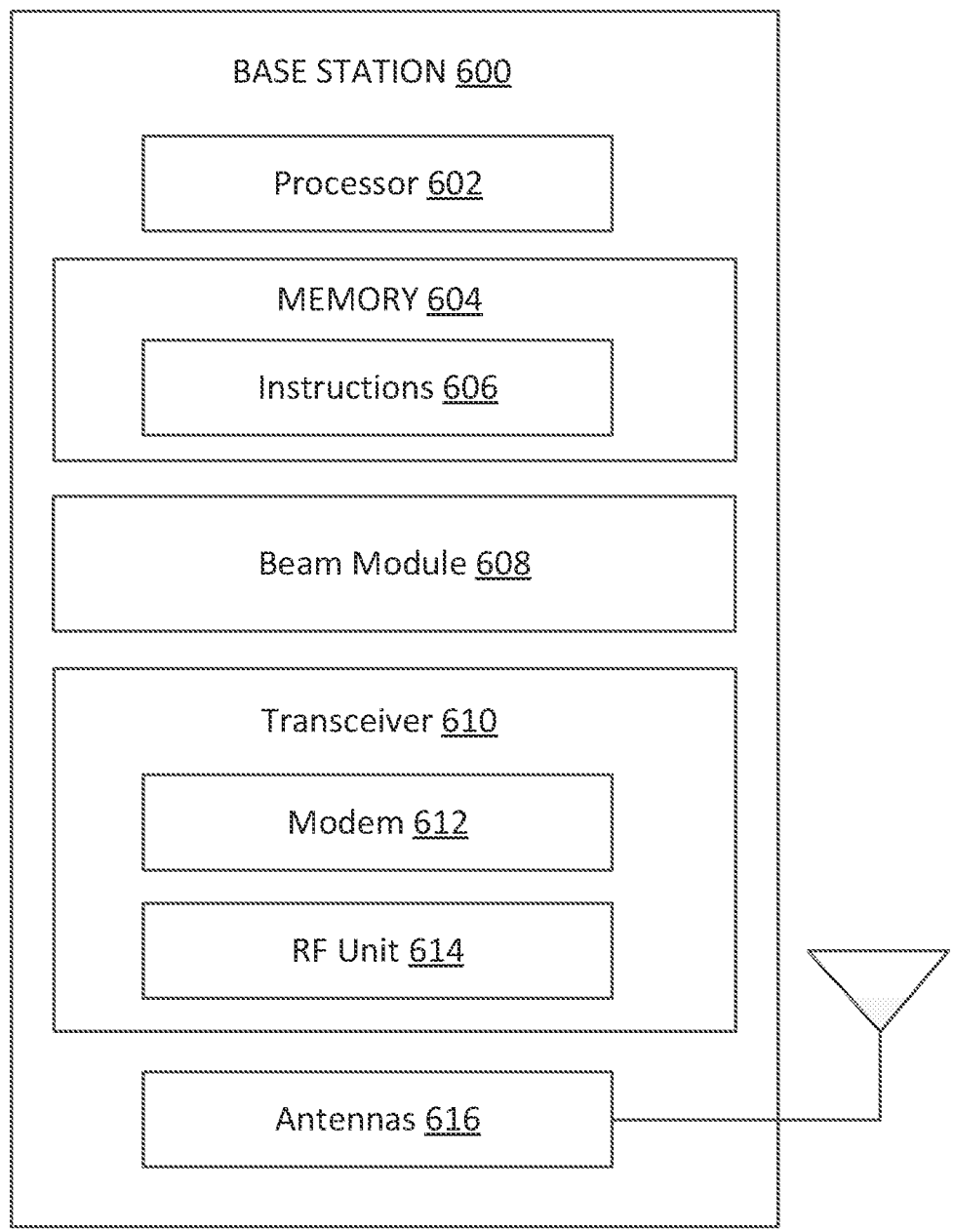
FIG. 6 is a block diagram of an exemplary base station (BS) according to some aspects of the present disclosure.

FIG. 6 is a block diagram of an exemplary BS 600 according to some aspects of the present disclosure. The BS 600 may be a BS 105 in the network 100 as discussed above in FIG. 1 or a node 315 discussed above in FIGS. 3 and 4. A shown, the BS 600 may include a processor 602, a memory 604, a beam module 608, a transceiver 610 including a modem subsystem 612 and a RF unit 614, and one or more antennas 616. These elements may be in direct or indirect communication with each other, for example via one or more buses.

The processor 602 may have various features as a specific-type processor. For example, these may include a CPU, a DSP, an ASIC, a controller, a FPGA device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 604 may include a non-transitory computer-readable medium. The memory 604 may store instructions 606. The instructions 606 may include instructions that, when executed by the processor 602, cause the processor 602 to perform operations described herein, for example, aspects of FIGS. 2-4 and 7-10. Instructions 606 may also be referred to as code, which may be interpreted broadly to include any type of computer-readable statement(s) as discussed above with respect to FIG. 5.

The beam module 608 may be implemented via hardware, software, or combinations thereof. For example, the beam module 608 may be implemented as a processor, circuit, and/or instructions 606 stored in the memory 604 and executed by the processor 602. In some instances, the beam module 608 can be integrated within the modem subsystem 612. For example, the beam module 608 can be implemented by a combination of software components (e.g., executed by a DSP or a general processor) and hardware components (e.g., logic gates and circuitry) within the modem subsystem 612.

The beam module 608 may be used for various aspects of the present disclosure, for example, aspects of aspects of FIGS. 2-4 and 7-10. The beam module 608 is configured to perform a common beam refinement and/or a common BFR with a group of peer nodes. For instance, the beam module 508 is configured to group multiple nodes into a group based on a correlated channel structure among the nodes. The grouping of the nodes may be based on location information, beam feedback information, network configuration information, and/or environmental information associated with the nodes. The beam module 608 is configured to communicate with the group of nodes using a first beam with a first beam characteristic (e.g., including a beam direction and/or a beamwidth), receive a beam refinement request from a node in the group, trigger a beam refinement for all nodes in the group based on the received beam refinement request, receive a BFR request (e.g., a random access request) from a node in the group, and trigger a BFR for all nodes in the group based on the BFR request.

In some aspects, upon receiving a beam refinement request from a node in the group, the beam module 608 is configured to configure the group of nodes with common CSI-RS resources and corresponding beam characteristics (e.g., with a finer beam direction and/or beamwidth granularity than the first beam). The beam module 608 is further configured to transmit CSI-RSs using the CSI-RS resources and corresponding beam characteristics, receive beam measurements (e.g., RSRPs or RSRQs or SNRs or SINRs) from one or more mode nodes of the group of nodes, select an optimal beam for the group of nodes based on the received CSI-RS reports, and configure the group of nodes to switch to the selected second beam.

In some aspects, upon receiving a BFR request from a node in the group, the beam module 608 is configured to transmit a random access response to the node in the selected beam direction to indicate a successful BFR, and configure other nodes in the group to switch to the beam selected by the node detecting the beam failure. Alternatively, in response to the BFR request, the beam module 608 is configured to configure the group of nodes with common CSI-RS resources and corresponding beam characteristics, transmit CSI-RSs according to the CSI-RS configuration, receive measurement reports from the nodes, and select a beam for the BFR based on the measurement reports. Mechanisms for performing a group-based common beam refinement and/or a group-based common BFR are described in greater detail herein.

As shown, the transceiver 610 may include the modem subsystem 612 and the RF unit 614. The transceiver 610 can be configured to communicate bi-directionally with other devices, such as the UEs 115 and/or 300 and/or another core network element. The modem subsystem 612 may be configured to modulate and/or encode data according to a MCS, e.g., a LDPC coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data (e.g., SSBs, RMSI, MIB, SIB, FBE configuration, PRACH configuration PDCCH, PDSCH) from the modem subsystem 612 (on outbound transmissions) or of transmissions originating from another source such as a UE 115, the node 315, and/or UE 500. The RF unit 614 may be further configured to perform analog beamforming in conjunction with the digital beamforming. Although shown as integrated together in transceiver 610, the modem subsystem 612 and/or the RF unit 614 may be separate devices that are coupled together at the BS 105 to enable the BS 105 to communicate with other devices.

The RF unit 614 may provide the modulated and/or processed data, e.g. data packets (or, more generally, data messages that may contain one or more data packets and other information), to the antennas 616 for transmission to one or more other devices. The antennas 616 may be similar to the antennas 302 of the BS 305 discussed above. This may include, for example, transmission of information to complete attachment to a network and communication with a camped UE 115 or 215 according to some aspects of the present disclosure. The antennas 616 may further receive data messages transmitted from other devices and provide the received data messages for processing and/or demodulation at the transceiver 610. The transceiver 610 may provide the demodulated and decoded data (e.g., PUCCH control information, PRACH signals, PUSCH data) to the beam module 608 for processing. The antennas 616 may include multiple antennas of similar or different designs in order to sustain multiple transmission links.

In an example, the transceiver 610 is configured to transmit, to a UE, system information including an FBE configuration indicating a plurality of frame periods, each including a gap period for contention at the beginning of the frame period, and communicate with the UE based on the FBE configuration, for example, by coordinating with the beam module 608.

In an aspect, the BS 600 can include multiple transceivers 610 implementing different RATs (e.g., NR and LTE). In an aspect, the BS 600 can include a single transceiver 610 implementing multiple RATs (e.g., NR and LTE). In an aspect, the transceiver 610 can include various components, where different combinations of components can implement different RATs.

Figure 7:
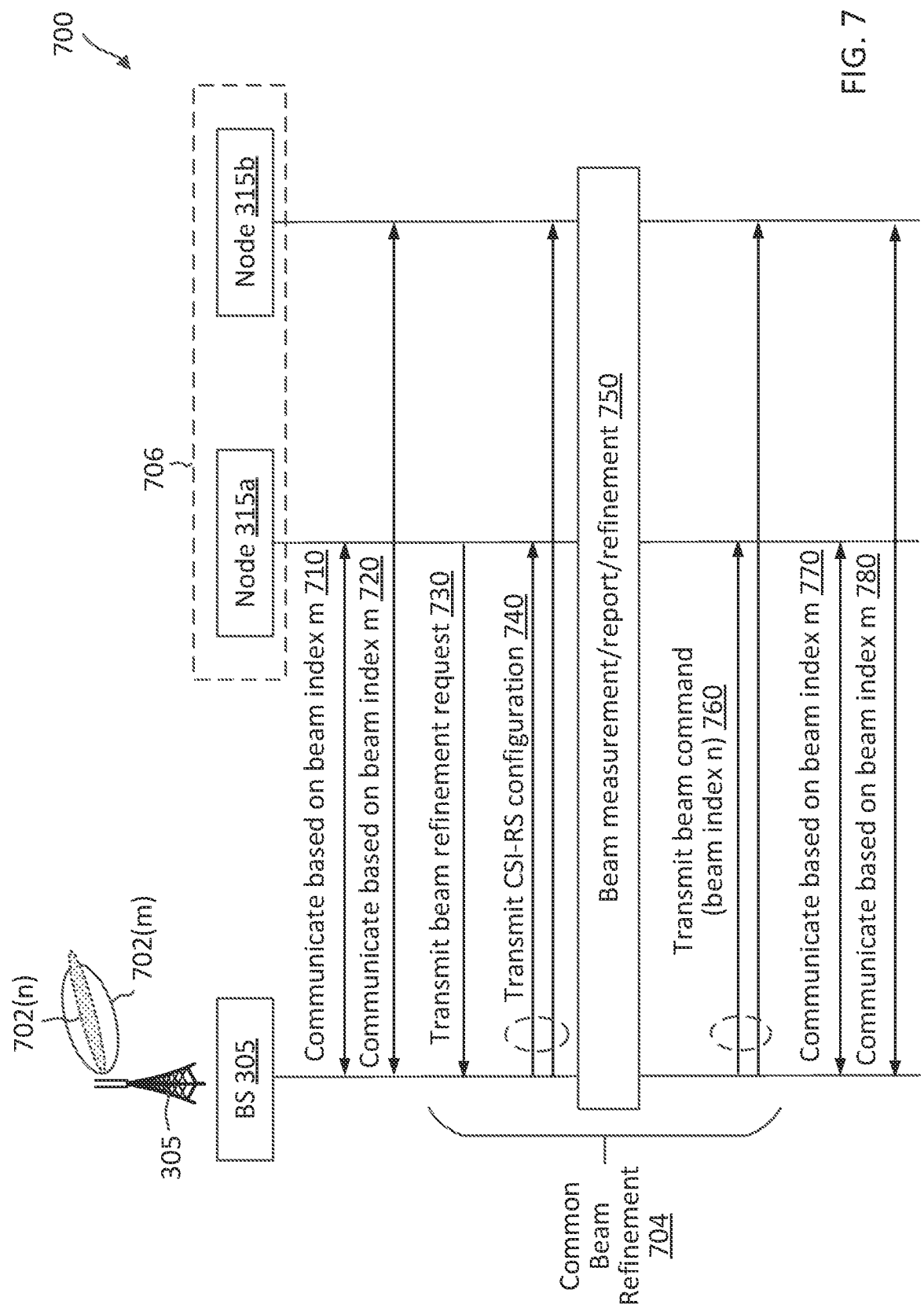
FIG. 7 is a signaling diagram of a group-based common beam refinement method according to some aspects of the present disclosure.

FIG. 7 is a signaling diagram of a group-based common beam refinement method 700 according to some aspects of the present disclosure. The method 700 may be implemented between the BS 305 and the nodes 315a and 315b in the network 300 (shown in FIG. 3). For instance, the BS 305 may utilize one or more components, such as the processor 602, the memory 604, the beam module 608, the transceiver 610, and the one or more antennas 616, to execute the steps of method 700. Similarly, each the node 315a, 315b may utilize one or more components, such as the processor 502, the memory 504, the beam module 508, the transceiver 510, and the one or more antennas 516, to execute the steps of method 700. As illustrated, the method 700 includes a number of enumerated steps, but embodiments of the method 700 may include additional steps before, after, and in between the enumerated steps. In some aspects, one or more of the enumerated steps may be omitted or performed in a different order.

The method 700 may begin after the BS 305 performs an initial beam selection or acquisition with the node 315a to select a beam 702($m$) for communication. The beam 702($m$) may have certain beam characteristics, such as a beam direction and a beamwidth. The beam 702 ($m$) and/or the beam characteristics may be identified by a beam index m. Similarly, the BS 305 performs an initial beam selection or acquisition with the node 315b to select the beam 702($m$) for communication. In the method 700, the BS 305 groups the node 315a and the node 315b into a group 706 for coordinated or common beam refinement 704. The grouping can be based on a correlated channel structure between the node 315a and the node 315b. For simplicity of discussion and illustration, the method 700 is described in the context of grouping of two nodes 315a and 315b for the common beam refinement. However, in general, the grouping can include any suitable number of nodes 315 (e.g., about 3, 4, 5, 6, 7 or more). The determination of the grouping can be based on various factors as discussed in greater detail herein.

At step 710, the BS 305 communicates with the node 315a using the beam 702($m$) based on the selected beam index m. In this regard, the BS 305 may transmit DL reference signal (e.g., CSI-RS), SSBs, DL control information such as UL and/or DL scheduling grants (e.g., carried in PDCCH signals), and/or DL data (e.g., carried in PDSCH signals) to the node 315a using the beam 702(m). The node 315a may transmit UL reference signals (e.g., SRSs), UL control information such as SR, CSI information, HARQ ACK/NACKs (e.g., carried in PUCCH signals), and/or UL data (e.g., carried in PUSCH signals) to the BS 305 using a transmission beam corresponding to a beam direction of the beam 702(m).

At step 720, the BS 305 communicates with the node 315b using the beam 702(m) based on the selected beam index m. Similar to the node 315a, the communication may include DL reference signals, SSBs, PDCCH signals, PDSCH signals, UL reference signals, PUCCH signals, and/or PUSCH signals. In some aspects, at least some of the communications at the step 710 and some of the communications at the step 720 can occur at the same time using FDM.

At step 730, the node 315a transmits a beam refinement request to the BS 305. In this regard, the node 315a may initiate the beam refinement based on beam measurements, for example, measured from reference signals, such as CSI-RSs, received from the BS 305. The beam measurements may include RSRPs, RSRQ, and/or SNRs. In some instances, the node 315a may determine the initiation based on a beam measurement falling below a certain threshold. In some instances, the node 315a may transmit the beam refinement request in a PUCCH signal.

At step 740, upon receiving the beam refinement request from the node 315a, the BS 305 transmits a CSI-RS configuration to the node 315a and the node 315b. The BS 305 may transmit the CSI-RS configuration to the node 315a and the node 315b based on the grouping. The CSI-RS configuration may indicate resources (e.g., time-frequency resources as shown in FIG. 2 and/or beam indices) configured for CSI-RS transmission. In some instances, the BS 305 may configure the CSI-RS resources via RRC signaling. For instance, the RRC configuration may include entries for CSI-RS resource information, which may indicate symbol locations (e.g., the symbols 206), subcarrier locations (e.g., the subcarriers 204), and/or a transmission configuration indicator (TCI) state (e.g., a beam index). Additionally, the CSI-RS configuration may include a CSI-RS reporting configuration. For instance, the BS 305 may indicate which of CSI-RS resources are activated for measurements and reporting. The activating of the CSI-RS resources and/or CSI-RS reporting can be performed using a bitmap, where each bit may correspond to a CSI-RS resource or a CSI-RS reporting. A bit-value of 1 may indicate the corresponding CSI-RS resource or the corresponding CSI-RS reporting is activated. A bit-value of 0 may indicate the corresponding CSI-RS resource or the corresponding CSI-RS reporting is not activated.

At step 750, the BS 305, the node 315a, and the node 315b may perform beam measurement, reporting, and refinement. In this regard, the BS 305 may transmit CSI-RSs in the CSI-RS configured resources and beam directions indicated by the CSI-RS configuration. The node 315a and/or the node 315b may determine channel measurements for the CSI-RSs. The measurements may include RSRPs and/or RSRQs. The node 315a and/or the node 315b may report the measurements to the BS 305. The BS 305 may determine a beam at a finer granularity than the beam 702(m) in terms of beam direction and/or beamwidth for communication with the node 315a and the node 315b based on the measurement reports. For instance, the BS may select a beam based on a measurement (reported by the nodes) meeting a certain measurement threshold. In the example illustrated in FIG. 7, the BS 305 selects the beam 702(n), which is a narrower beam than the beam 702(m). The narrower beam 702(n) may have a higher gain (e.g., higher transmission energy) than the beam 702(m) due to the narrower beamwidth.

At step 760, in response to the selection of the beam 702(n), the BS 305 transmits a beam command to instruct the node 315a and the node 315b to switch to the beam 702(n) for subsequent communications. For instance, the beam command may indicate a TCI state value (e.g., the beam index n) corresponding to the beam 702(n).

At step 770, the BS 305 communicates with the node 315a using the beam 702(m) based on the index n of the refined beam selection. In this regard, the node 315a may switch from the beam 702(n) to the beam 702(m) for the communication. The node 315a may use digital beamforming and/or analog beamforming to beamform transmission beam and/or reception beam in the direction of the beam 702(n) for transmitting to the BS and/or receiving from the BS, respectively. In some instances, the node 315a may reconfigure a receive antenna array (e.g., the antennas 516) of the node 315a to beamform in the direction of the beam 702(n) to generate a receive beam for receiving DL signals (e.g., DL reference signals, PDCCH signals, and/or PDSCH signals) from the BS 305. Similarly, the node 315a may reconfigure a transmit antenna array (e.g., the antennas 516) of the node 315a to beamform in the direction of the beam 702(n) to generate a transmit beam for transmitting UL signals (e.g., UL reference signals, PUCCH signals, and/or PUSCH signals) to the BS 305.

At step 780, the BS 305 communicates with the node 315b using the beam 702(m) based on the refined beam index n. The node 315b may use substantially similar mechanisms as the node 315a discussed in the step 770 to switch from the beam 702(n) to the beam 702(m). In some instances, at least some of the communications at the step 770 and some of the communications at the step 780 can occur at the same time using FDM.

While the method 700 illustrates the beam refinement (e.g., from the beam 702(m) to the beam 702(n) in terms of beamwidth, in general, a beam refinement can include a refinement of any beam characteristic, such as beam direction, beamwidth, or a combination thereof. Additionally, while the method 700 illustrates the beam refinement initiated by the node 315a, the BS 305 may also initiate a common beam refinement for the nodes 315a and 315b based on measurements reported by the nodes 315a and/or 315b. Further, while the method 700 is described in the context of a BS 305 performing a common beam refinement 704 with a group of nodes 315, the method 700 may be implemented between a node 315 or a UE 115 and a group of peer nodes (e.g., the nodes 315, the UEs 115, and/or CPE) for D2D or sidelink communication. For instance, a node or a UE communicating with multiple nodes or UEs over sidelink may utilize the method 700 for a common beam refinement with the multiple nodes or UEs.

In general, the BS 305 may provision common CSI-RS resources to a group of nodes 315 and may configure multiple nodes 315 in the group for beam refinement. The BS 305 may leverage information (e.g., measure reports) obtained from the beam refinement procedure from one node 315 in the group to trigger a beam refinement for multiple nodes 315 in the group. The triggering of the beam refinement may be in the form of a common CSI-RS resource configuration and/or a common CSI-RS reporting configuration for the group of nodes or a beam switch command for the group of nodes.

In some aspects, the BS 305 may select a node 315 from the group of nodes associated with a common beam refinement as an anchor node for performing the common beam refinement. The anchor node may report measurements and/or request beam refinement. The anchor node may represent the group of nodes for beam refinement. In the illustrated example of FIG. 7, the node 315*a* may be the anchor node. In some instances, the BS 305 may dynamically configure a node as an anchor node for the common beam refinement based on a wake-up-sleep cycle of the node, a capability of the node, a data payload size associated with transmission of the node. In this regard, the BS 305 may select a node that has a sufficient amount of wake-up time for beam measurements and reporting as the anchor node. Alternatively or additionally, the BS 305 may select a node that has a high processing capability and/or power capability among the group of nodes as the anchor node. Alternatively or additionally, the BS 305 may select a node that has a larger transmission data payload size among the group of nodes as the anchor node so that the signaling overhead is relatively less significant at the anchor node compared to other nodes with a smaller transmission data payload size.

Figure 8:
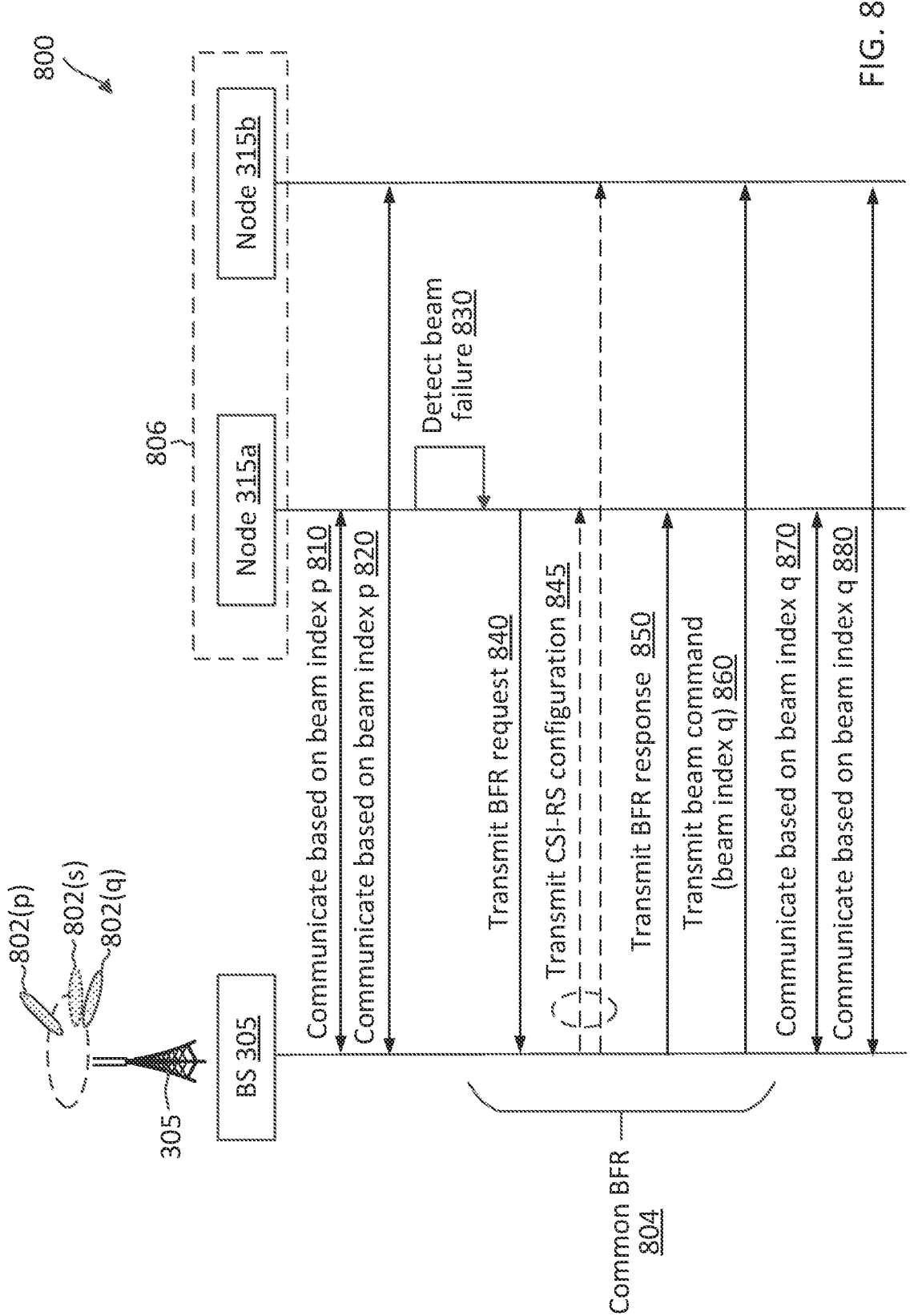
FIG. 8 is a signaling diagram of a group-based common beam failure recovery (BFR) method according to some aspects of the present disclosure.

FIG. 8 is a signaling diagram of a group-based common BFR method 800 according to some aspects of the present disclosure. The method 800 may be implemented between the BS 305 and the nodes 315*a* and 315*b* of the network 300 (shown in FIG. 3). For instance, the BS 305 may utilize one or more components, such as the processor 602, the memory 604, the beam module 608, the transceiver 610, and the one or more antennas 616, to execute the steps of method 800. Similarly, each the node 315*a*, 315*b* may utilize one or more components, such as the processor 502, the memory 504, the beam module 508, the transceiver 510, and the one or more antennas 516, to execute the steps of method 700. As illustrated, the method 700 includes a number of enumerated steps, but embodiments of the method 800 may include additional steps before, after, and in between the enumerated steps. In some aspects, one or more of the enumerated steps may be omitted or performed in a different order.

Generally speaking, the method 800 includes features similar to method 700 in many respects. For example, the method 800 may begin after the BS 305 performed an initial beam selection or acquisition with the node 315*a* to select a beam 802(*p*) for communication. The beam 802(*p*) may have certain beam characteristics, such as a beam direction and a beamwidth. The beam 802 (*p*) and/or the beam characteristics may be identified by beam index p. Similarly, the BS 305 performed an initial beam selection or acquisition with the node 315*b* to select the beam 802(*p*) for communication. Additionally, steps 810, 820, 845, 860, 870, and 880 are similar to steps 710, 720, 740, 760, 770, and 780, respectively. Accordingly, for sake of brevity, details of those steps will not be described in detail here. Please refer to the corresponding descriptions above.

In the method 800, the BS 305 groups the node 315*a* and the node 315*b* into a group 806 for coordinated or common BFR 804. The grouping can be substantially similar to a grouping used for a common beam refinement (e.g., the common beam refinement 704).

At step 810, the BS 305 communicates with the node 315*a* using the beam 802(*p*) based on the selected beam index p.

At step 820, the BS 305 communicates with the node 315*b* using the beam 802(*p*) based on the selected beam index m.

At step 830, the node 315*a* detects a beam failure. In this regard, the node 315*a* may determine that a beam measurement, such as a RSRP and/or a RSRQ, for the beam 802(*p*) falls below a certain threshold. In some instances, the node 315*a* may determine that the beam fails upon detecting a beam measurement falls below the threshold. In some other instances, the node 315*a* may determine that the beam fails after a number of beam measurements fall below the threshold.

At step 840, upon detecting the beam failure, the node 315*a* transmits a BFR request to the BS 305 to trigger a BFR. In this regard, upon detecting the beam failure, the node 315*a* may search for SSBs in different beam directions, identify a good beam, and transmit a PRACH signal to the BS in the beam direction of the good beam. The node 315*a* may identify that a beam is a good beam based on measurements of the SSB in the beam direction meeting a certain measurement threshold. The node 315*a* may transmit the PRACH signal in the PRACH resources (e.g., time-frequency resources as shown in FIG. 2) associated with the good beam. In the illustrated example of FIG. 8, the node 315*a* may perform measurements on the beam 802(*s*) and the beam 802(*q*) and select the beam 802(*q*) over the beam 802(*s*) based on the beam 802(*q*) providing a higher RSRP and/or a higher RSRQ than the beam 802(*s*). Thus, the node 315*a* may transmit the BFR request using PRACH resources associated with the beam 802(*q*).

In some aspects, the BS 305 may configure PRACH resources for each beam direction and may indicate the PRACH resources associated with each beam in broadcast system information. Alternatively, the BS 305 may configure common PRACH resources for the group of nodes (e.g., the nodes 315*a* and 315*b*) and transmit the common PRACH resource configuration to the group of nodes. In some instances, the PRACH resources may be a contention free random access (CFRA) process. For instance, each node 315 may be assigned with a unique random access sequence so that PRACH signals transmitted by the node 315 may not overlap or collide with each other when the nodes 315 use the same PRACH resource for the PRACH transmissions.

At step 850, upon detecting the BFR request, the BS 305 transmits a BFR response to the node 315*a* using the beam 802(*q*). The BFR response may be similar to a random access response message (e.g., MSG2). The BFR response may provide a UL grant to the node 315*a* for a subsequent UL transmission. The BFR response may indicate a successful switch to the beam 802(*q*).

At step 860, in response to the BFR request and BFR response, the BS 305 transmits a beam command to instruct the node 315*b* to switch to the beam 802(*q*) for subsequent communications. In other words, the BS 305 triggers the beam switch for the node 315*b* based on a beam selection by the node 315*a* (via the BFR request) and the grouping of the node 315*a* and 315*b* for the common BFR 804. In general, the BS 305 may trigger a BFR and/or beam switch at a group of nodes based on a BFR request from one of the nodes in the group.

In some instances, the node 315*b* may be configured with a wake-up-sleep cycle, and thus the BS 305 may transmit the beam switch command to the node 315*b* during a wake-up duration of the node 315*b*.

At step 870, the BS 305 communicates with the node 315*a* using the beam 802(*q*) based on the beam index q.

At step 880, the BS 305 communicates with the node 315*b* using the beam 802(*q*) based on the beam index q.

In some aspects, the BS 305 may respond to the BFR request by configuring common CSI-RS resources for the nodes 315a and 315b. In this regard, at step 845, the BS 305 transmits a CSI-RS configuration to the nodes 315a and 315b. The BS 305, the node 315a, and the node 315b may perform may beam measurement, reporting, and refinement to select a new beam (e.g., the beam 802(q)) similar to the step 750 of the method 800 described above with reference to FIG. 7.

In some aspects, the BS 305 may select a node 315 from the group of nodes associated with a common BFR as an anchor node for performing the common BFR. The anchor node may report measurements and/or request BFR. In the illustrated example of FIG. 8, the node 315a may be the anchor node. Similar to the method 700, the BS 305 may dynamically configure a node as an anchor node for the common BFR based on a wake-up-sleep cycle of the node, a capability of the node, a data payload size associated with transmission of the node as discussed with reference to FIG. 7.

While the method 800 is described in the context of a BS 305 performing a common BFR 804 with a group of nodes 315, the method 700 may be implemented between a node 315 or a UE 115 and a group of peer nodes (e.g., the nodes 315, the UEs 115, and/or CPE) for sidelink communication. For instance, a node or UE communicating with multiple nodes or UEs over sidelink may utilize the method 800 for a common BFR with the multiple nodes or UEs.

As can be observed from the methods 700 and 800, a BS (e.g., the BSs 105, 305, and/or 600) may determine a beam or switch a beam for communication with a group of nodes (e.g., the UEs 115, the nodes 315, and/or the UE 500) based on a beam measurement feedback, a beam refinement request, and/or a BFR request from one of the nodes in the group. The beam determination or switching is based on the group of nodes having a correlated channel structure. Mechanisms for forming a group of nodes for a common beam refinement and/or a common BFR are described in greater detail herein below with reference to FIG. 9.

Further, the methods 700 and 800 can reduce the amount of control signaling overhead associated with beam refinement and/or BFR. For instance, due to the correlated channel structures among the group of nodes, when one node experiences a degradation in beam measurements or beam failure, multiple nodes in the group may experience similar degradation in beam measurements or beam failures. Thus, instead of having each node in the group transmitting a beam refinement request and/or BFR request to the BS 305 to request a beam change, a single node can transmit a beam refinement request and/or a BFR request and the BS 305 may switch the entire group of nodes to a new beam based on the beam change request from one node. The savings in the control signaling can be significant when a network includes a massive number of nodes, for example, in the order of tens of thousands of nodes.

Figure 9:
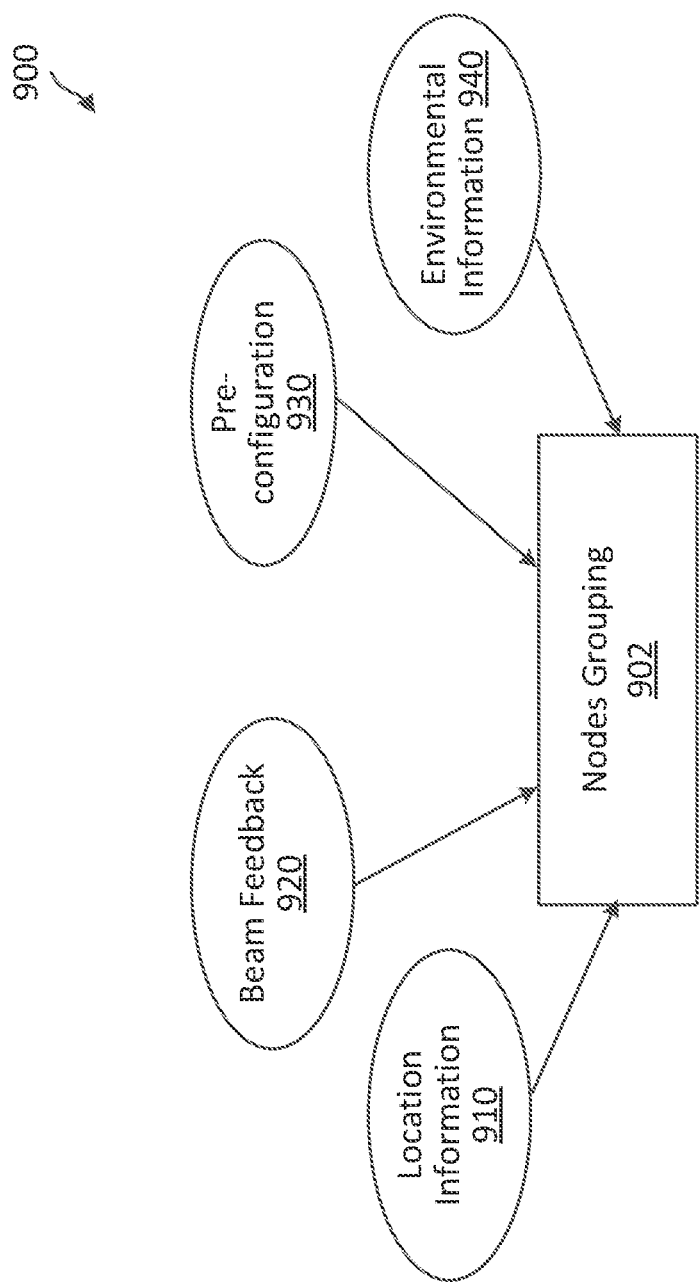
FIG. 9 illustrates a node grouping scheme for common beam refinement and common BFR according to some aspects of the present disclosure.

FIG. 9 illustrates a node grouping scheme 900 for common beam refinement and common BFR according to some aspects of the present disclosure. The scheme 900 can be employed by a network such as the networks 100, 300, and 400. In particular, a BS such as the BSs 105, 305, and/or 600 may group multiple UEs such as the UEs 115, the nodes 315, and/or the UE 500 into a group for performing a common beam refinement procedure (e.g., the common beam refinement 704) and/or a common BFR procedure (e.g., the common BFR 804). The scheme 900 can be used in conjunction with the methods 700 and/or 800 discussed above with reference to FIGS. 7 and/or 8, respectively.

As shown in the method 700, a BS (e.g., the BSs 105, 305, and/or 600) may perform node grouping 902 based on location information 910, beam feedback 920, a pre-configuration 930, environmental information 940, or any combinations thereof. In some instances, the BS may utilize one or more components, such as the processor 602, the memory 604, the beam module 608, the transceiver 610, and the one or more antennas 616, to perform the node grouping 902.

With regard to the location information 910, the BS may form a group of nodes (e.g., the UEs 115, the nodes 315, and/or the UE 500) for a common beam refinement or a common BFR based on the nodes being located at geographical locations that are in close proximity to each other. For instance, the BS may determine geographical locations of the nodes using location estimation algorithms that are based on global positioning system (GPS) and/or global navigational satellite system (GNSS) information associated with the nodes. The GPS and/or GNSS information may indicate geographical coordinates of the nodes and the BS may determine that the nodes are located close to each other in a certain direction towards the BS based on the geographical coordinates.

With regard to the beam feedback 920, the BS may receive beam measurements (e.g., RSRPs and/or RSRQs) from the nodes. The BS may group nodes that have similar RSRPs and/or RSRQs for each beam in a certain set of beams. The BS may determine that the nodes have similar RSRPs and/or RSRQs for a certain beam when the RSRPs and/or RSRQs reported by the nodes are within a few decibels of each other or based on a certain measurement difference threshold. For instance, the BS may determine that the nodes have similar RSRPs when the RSRPs differ from each other by less than about 3 dB or less than about 5 dB. Similarly, the BS may determine that the nodes have similar RSRQs when the RSRQs differ from each other by less than about 3 dB or less than about 5 dB. In some aspects, the BS may receive RSRPs and/or RSRQs from the nodes for a set of beam indices. The BS may compare the differences among RSRPs and/or RSRQs reported by different nodes for each beam index. The BS may determine a measurement difference between any two nodes based on an average of measurement differences between the two nodes for all beam indices in the set of beam indices. The beam feedback 920 may generally provide an indication of spatial orientations and/or spatial positions of the nodes relative to the BS.

With regard to the pre-configuration 930, a network, such as a private industrial network, may be deployed using a certain configuration, and the locations of the nodes may be relatively static. In some instances, nodes may be grouped in a specific area for a particular operation. Thus, the BS may utilize the network configuration information, which may include location information, network initialization, network deployment configurations, to form a node group for common beam refinement and/or common BFR.

With regard to the environmental information 940, the BS may identify environmental factors that may influence a channel or signal propagation path between the BS and the nodes and group nodes that are impacted by similar environmental factors. The environmental factors may include clusters (e.g., the clusters 410, 412, 414) and/or blockers (e.g., the blocker 430). Some example clusters and/or blockers may include walls, equipment, and/or any objects located along communication paths between the BS and the nodes. The BS may learn the environmental factors associated with each beam based on measurements reported by each node for each beam.

In some aspects, the BS may prioritize the different factors when grouping nodes for a common beam refinement and/or a common BFR. For instance, the BS may prioritize the location information 910, the beam feedback 920, the pre-configuration 930, and the environmental information 940 in order when forming a node group for a common beam refinement and/or a common BFR.

Figure 10:
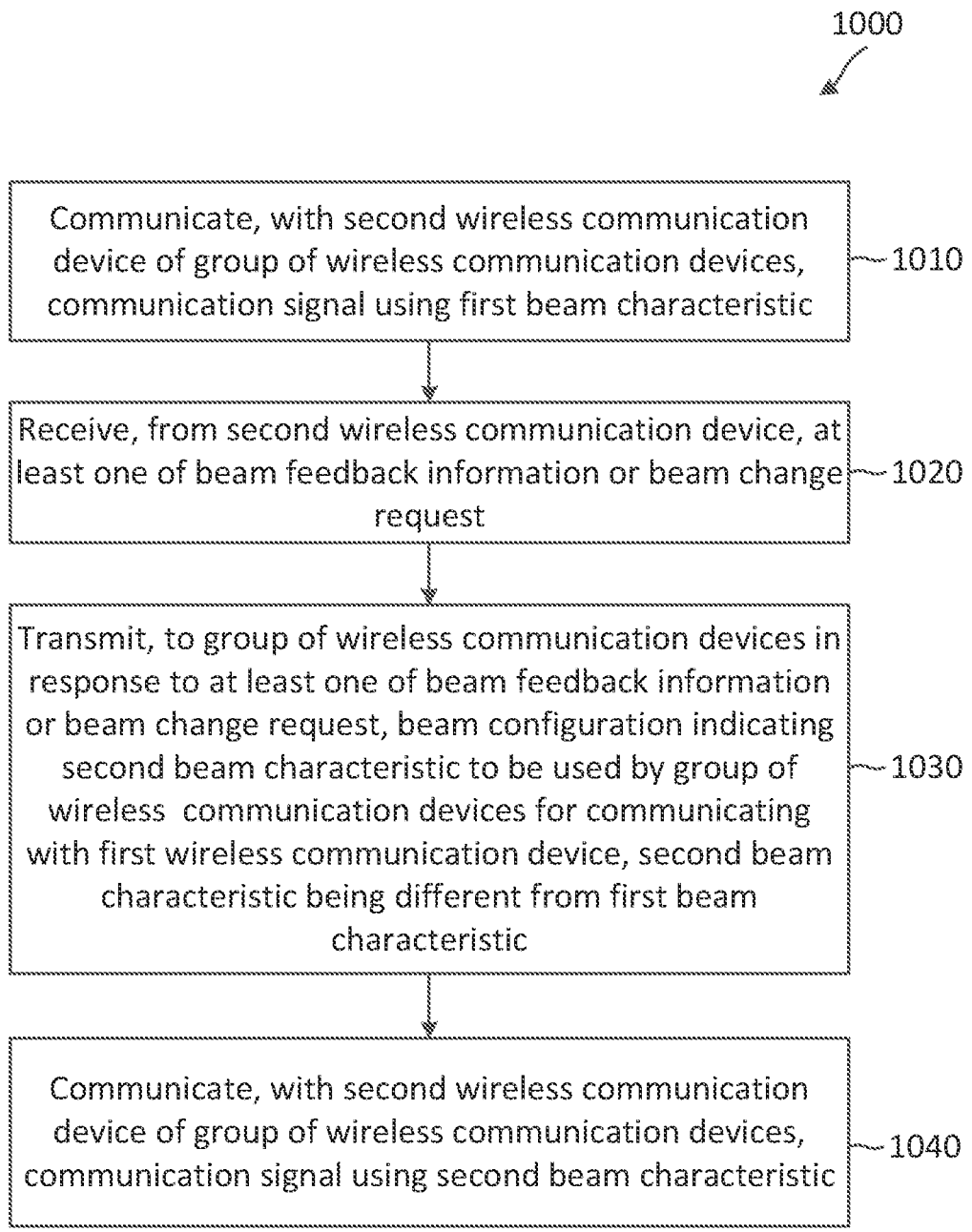
FIG. 10 is a flow diagram of a communication method according to some aspects of the present disclosure.

FIG. 10 is a flow diagram of a communication method 1000 according to some aspects of the present disclosure. Steps of the method 1000 can be executed by a computing device (e.g., a processor, processing circuit, and/or other suitable component) of an apparatus or other suitable means for performing the steps. For example, a UE, such as the UEs 115, the node 315, and/or the UE 500, may utilize one or more components, such as the processor 502, the memory 504, the beam module 508, the transceiver 510, and the one or more antennas 516, to execute the steps of method 1000. Alternatively, a BS, such as the BSs 105, the BS 305, and/or the BS 600, may utilize one or more components, such as the processor 602, the memory 604, the beam module 608, the transceiver 610, and the one or more antennas 616, to execute the steps of method 1000. The method 1000 may employ similar mechanisms as in the methods 700 and/or 800 described above with respect to FIGS. 7 and/or 8, respectively, and/or the scheme 900 described above with respect to FIG. 9. As illustrated, the method 1000 includes a number of enumerated steps, but aspects of the method 1000 may include additional steps before, after, and in between the enumerated steps. In some aspects, one or more of the enumerated steps may be omitted or performed in a different order.

At block 1010, a first wireless communication device communicates, with a second wireless communication device of a group of wireless communication devices, a communication signal using a first beam characteristic. In some instances, the first wireless communication device may utilize one or more component, such as a processor (e.g., the processor 502 or 602), a memory (e.g., the memory 504 or 604), a beam module (e.g., the beam module 508 or 608), a transceiver (e.g., the transceiver 510 or 610), and one or more antennas (e.g., the antennas 516 or 616), to communicate the communication signal using the first beam characteristics. The first wireless communication devices may perform digital beamforming and/or analog beamforming at the transceiver to generate a beam with the first beam characteristic for the communication.

In some aspects, the first wireless communication device may correspond to a BS (e.g., the BSs 105, 305, and/or 600)), a transmission reception point (TRP), an integrated access and backhaul (IAB) node, a side link node, or a relay node, and the second wireless communication device may correspond to a UE (e.g., the UEs 115 and/or 500 and/or the nodes 315), a customer premises equipment (CPE), a side link node, a relay node, a smart repeater (e.g., a repeater with additional signal processing to improve delivery of repeated signal), a dumb repeater (e.g., a repeater that receives and forwards signals without additional signal processing), or an IAB node. In some other aspects, the first wireless communication device and the second wireless communication device may each correspond to a UE, a CPE (e.g., the UEs 115 and/or 500 and/or the nodes 315), a sidelink node, a relay node, a smart repeater, a dumb repeater, or an IAB node. In some aspects, the group of wireless communication devices are IoT devices.

At block 1020, the first wireless communication device receives, from the second wireless communication device, at least one of beam feedback information or a beam change request. In some instances, the first wireless communication device may utilize one or more component, such as a processor (e.g., the processor 502 or 602), a memory (e.g., the memory 504 or 604), a beam module (e.g., the beam module 508 or 608), a transceiver (e.g., the transceiver 510 or 610), and one or more antennas (e.g., the antennas 516 or 616), to receive the at least one of the beam feedback information or the beam change request.

At block 1030, the first wireless communication device transmits, to the group of wireless communication devices in response to the at least one of the beam feedback information or the beam change request, a beam configuration indicating a second beam characteristic to be used by the group of wireless communication devices for communicating with the first wireless communication device, where the second beam characteristic being different from the first beam characteristic. In some instances, the first wireless communication device may utilize one or more component, such as a processor (e.g., the processor 502 or 602), a memory (e.g., the memory 504 or 604), a beam module (e.g., the beam module 508 or 608), a transceiver (e.g., the transceiver 510 or 610), and one or more antennas (e.g., the antennas 516 or 616), to transmit the beam configuration to the group of wireless communication devices.

In some aspects, the beam feedback information is associated with reference signal measurements, such as RSRPs and/or RSRQs for CSI-RSs transmitted by the first wireless communication device. In some aspects, the beam change request is a beam refinement request. In some aspects the beam change request is a BFR request.

At block 1040, the first wireless communication device communicates, with the second wireless communication device, a further communication signal using the second beam characteristic based on the beam configuration. In some instances, the first wireless communication device may utilize one or more component, such as a processor (e.g., the processor 502 or 602), a memory (e.g., the memory 504 or 604), a beam module (e.g., the beam module 508 or 608), a transceiver (e.g., the transceiver 510 or 610), and one or more antennas (e.g., the antennas 516 or 616), to communicate the further communication signal using the second beam characteristics based on the beam configuration.

In some aspects, the first beam characteristic is associated with a first beam direction, and the second beam characteristic is associated with a second beam direction different from the first beam direction.

In some aspects, the first beam characteristic is associated with a first beamwidth, and the second beam characteristic is associated with a second beamwidth different from the first beamwidth.

In some aspects, the beam configuration includes a beam switch command instructing the group of wireless communication devices to switch from a first beam index identifying the first beam characteristic to a second beam index identifying the second beam characteristic.

In some aspects, the first wireless communication device may further transmits a common BFR resource configuration, a common CSI-RS resource configuration with corresponding CSI-RS beam characteristics, and/or a common CSI-RS reporting configuration to the group of wireless communication devices. In some aspects, the first wireless communication device may receive the BFR request as a PRACH signal based on the common BFR resource configuration. In some aspects, the first wireless communication device may further transmits one or more CSI-RSs based on the CSI-RS resource configuration corresponding beam characteristics and may receive the beam feedback information indicating measurements for the one or more CSI-RSs. In some aspects, the first wireless communication device may transmit the CSI-RS resource configuration and/or the CSI-RS reporting configuration in response to the beam change request.

In some aspects, the first wireless communication device further determines to form the group of wireless communication devices for at least one of a common beam refinement (e.g., the common beam refinement 704) or a common BFR (e.g., the common BFR 804), where the beam configuration is associated with the at least one of the common beam refinement or the common BFR. For instance, the first wireless communication device may form the group by implementing the scheme 900 discussed above with reference to FIG. 9.

In some aspects, the communications discussed with reference to the block 1010 and the block 1040, the beam feedback information and/or the beam request discussed with reference to the block 1020, and the beam configuration discussed with reference to the block 1030 are communicated over a mmWave band.

Further aspects of the present disclosure include a method of wireless communication. The method of wireless communication includes communicating, by a first wireless communication device with a second wireless communication device of a group of wireless communication devices, a communication signal using a first beam characteristic. The method of wireless communication also includes receiving, by the first wireless communication device from the second wireless communication device, at least one of beam feedback information or a beam change request. The method of wireless communication also includes transmitting, by the first wireless communication device to the group of wireless communication devices in response to the at least one of the beam feedback information or the beam change request, a beam configuration indicating a second beam characteristic to be used by the group of wireless communication devices for communicating with the first wireless communication device, the second beam characteristic being different from the first beam characteristic.

The method may also include one or more of the following features. For instance, the method may include where the first beam characteristic is associated with a first beam direction, and where the second beam characteristic is associated with a second beam direction different from the first beam direction. The first beam characteristic is associated with a first beamwidth, and where the second beam characteristic is associated with a second beamwidth different from the first beamwidth. The transmitting the beam configuration includes transmitting, by the first wireless communication device to the group of wireless communication devices, a beam switch command to switch from a first beam index identifying the first beam characteristic to a second beam index identifying the second beam characteristic. The method may include communicating, by the first wireless communication device with the second wireless communication device, a further communication signal using the second beam characteristic based on the beam configuration. The receiving includes receiving, by the first wireless communication device from the second wireless communication device, a beam refinement request. The receiving includes receiving, by the first wireless communication device from the second wireless communication device, a beam failure recovery request. The receiving the beam failure recovery request is based on the beam failure recovery resource configuration. The method may include transmitting, by the first wireless communication device to the group of wireless communication devices, a reference signal configuration for the group of wireless communication devices. The reference signal configuration indicates at least one of channel state information-reference signal (CSI-RS) resources, CSI-RS beam characteristics, or a CSI-RS reporting configuration. The transmitting the reference signal configuration includes transmitting, by the first wireless communication device to the group of wireless communication devices, an activation for the at least one of the CSI-RS resources, the CSI-RS beam characteristics, or the CSI-RS reporting configuration. The transmitting the reference signal configuration is in response to the at least one of the beam feedback information or the beam change request. The method may include transmitting, by the first wireless communication device to the group of wireless communication devices, a plurality of reference signals, each reference signal of the plurality of reference signals transmitted using a different beam characteristic based on the reference signal configuration. The receiving is based on one or more reference signals of the plurality of reference signals. The beam configuration is associated with the at least one of the common beam refinement or the common beam failure recovery. The determining is based on geographical location information. The determining is based on the beam feedback information. The determining is based on a network configuration. The determining is based on environmental information. The method may include selecting, by the first wireless communication device, the second wireless communication device from among the group of wireless communication devices as an anchor for a common beam refinement or a common beam failure recovery for the group of wireless communication devices based on at least one of a wake-up-sleep cycle of the second wireless communication device, a capability the second wireless communication device, or a transmission payload size associated with the second wireless communication device; and transmitting, by the first wireless communication device to the second wireless communication device, an anchor configuration to configure the second wireless communication device as the anchor for the common beam refinement or the common beam failure recovery. The communicating includes communicating, by the first wireless communication device with the second wireless communication device, the communication signal in a millimeter wave (mmWave) frequency band. The first wireless communication device is a base station (BS), and where the second wireless communication device is a user equipment (UE) or a customer premise equipment (CPE). Each of the first wireless communication device and the second wireless communication device is a user equipment (UE) or a customer premise equipment (CPE). The second wireless communication device is an internet of thing (IoT) device.

Further aspects of the present disclosure include an apparatus including a transceiver configured to communicate, with a first wireless communication device of a group of wireless communication devices, a communication signal using a first beam characteristic; receive, from the first wireless communication device, at least one of beam feedback information or a beam change request; and transmit, to the group of wireless communication devices in response to the at least one of the beam feedback information or the beam change request, a beam configuration indicating a second beam characteristic to be used by the group of wireless communication devices for communicating with the apparatus, the second beam characteristic being different from the first beam characteristic.

The apparatus may also include one or more of the following features. For instance, the apparatus may include where the first beam characteristic is associated with a first beam direction, and where the second beam characteristic is associated with a second beam direction different from the first beam direction. The first beam characteristic is associated with a first beamwidth, and where the second beam characteristic is associated with a second beamwidth different from the first beamwidth. The transceiver configured to transmit the beam configuration is configured to transmit, to the group of wireless communication devices, a beam switch command to switch from a first beam index identifying the first beam characteristic to a second beam index identifying the second beam characteristic. The transceiver is further configured to communicate, with the first wireless communication device, a further communication signal using the second beam characteristic based on the beam configuration. The transceiver configured to receive the at least one of the beam feedback information or the beam change request is configured to receive, from the first wireless communication device, a beam refinement request. The transceiver configured to receive the at least one of the beam feedback information or the beam change request is configured to receive, from the first wireless communication device, a beam failure recovery request. Colon>the transceiver is further configured to transmit, to the group of wireless communication devices, a beam failure recovery resource configuration for the group of wireless communication devices; and the transceiver configured to receive the beam failure recovery request is configured to receive the beam failure recovery request based on the beam failure recovery resource configuration. The transceiver is further configured to transmit, to the group of wireless communication devices, a reference signal configuration for the group of wireless communication devices. The reference signal configuration indicates at least one of channel state information-reference signal (CSI-RS) resources, CSI-RS beam characteristics, or a CSI-RS reporting configuration. The transceiver configured to transmit the reference signal configuration is configured to transmit, to the group of wireless communication devices, an activation for the at least one of the CSI-RS resources, the CSI-RS beam characteristics, or the CSI-RS reporting configuration. The transceiver configured to transmit the reference signal configuration is configured to transmit the reference signal configuration in response to the at least one of the beam feedback information or the beam change request. The transceiver is further configured to transmit, to the group of wireless communication devices, a plurality of reference signals, each reference signal of the plurality of reference signals transmitted using a different beam characteristic based on the reference signal configuration. The transceiver configured to receive the at least one of the beam feedback information or the beam change request is configured to receive the at least one of the beam feedback information or the beam change request based on one or more reference signals of the plurality of reference signals. The beam configuration is associated with the at least one of the common beam refinement or the common beam failure recovery. The processor configured to determine to form the group of wireless communication devices for the at least one of the common beam refinement or the common beam failure recovery is configured to determine to form the group of wireless communication devices for the at least one of the common beam refinement or the common beam failure recovery based on geographical location information. The processor configured to determine to form the group of wireless communication devices for the at least one of the common beam refinement or the common beam failure recovery is configured to determine to form the group of wireless communication devices for the at least one of the common beam refinement or the common beam failure recovery based on the beam feedback information. The processor configured to determine to form the group of wireless communication devices for the at least one of the common beam refinement or the common beam failure recovery is configured to determine to form the group of wireless communication devices for the at least one of the common beam refinement or the common beam failure recovery based on a network configuration. The processor configured to determine to form the group of wireless communication devices for the at least one of the common beam refinement or the common beam failure recovery is configured to determine to form the group of wireless communication devices for the at least one of the common beam refinement or the common beam failure recovery based on environmental information. Colon>the processor is further configured to select the first wireless communication device from among the group of wireless communication devices as an anchor for a common beam refinement or a common beam failure recovery for the group of wireless communication devices based on at least one of a wake-up-sleep cycle of the first wireless communication device, a capability the first wireless communication device, or a transmission payload size associated with the first wireless communication device; and the transceiver is further configured to transmit, to the first wireless communication device, an anchor configuration to configure the first wireless communication device as the anchor for the common beam refinement or the common beam failure recovery. The transceiver configured to communicate the communication signal is configured to communicate, with the first wireless communication device, the communication signal in a millimeter wave (mmWave) frequency band. The apparatus is a base station (BS), and where the first wireless communication device is a user equipment (UE) or a customer premise equipment (CPE). Each of the apparatus and the first wireless communication device is a user equipment (UE) or a customer premise equipment (CPE). The first wireless communication device is an internet of thing (IoT) device.

Further aspects of the present disclosure include a non-transitory computer-readable medium having program code recorded thereon. The non-transitory computer-readable medium includes code for causing a first wireless communication device to communicate, with a second wireless communication device of a group of wireless communication devices, a communication signal using a first beam characteristic. The non-transitory computer-readable medium also includes code for causing the first wireless communication device to receive, from the second wireless communication device, at least one of beam feedback information or a beam change request. The non-transitory computer-readable medium also includes code for causing the first wireless communication device to transmit, to the group of wireless communication devices in response to the at least one of the beam feedback information or the beam change request, a beam configuration indicating a second beam characteristic to be used by the group of wireless communication devices for communicating with the first wireless communication device, the second beam characteristic being different from the first beam characteristic.

The non-transitory computer-readable medium may also include one or more of the following features. For instance, the non-transitory computer-readable medium may include where the first beam characteristic is associated with a first beam direction, and where the second beam characteristic is associated with a second beam direction different from the first beam direction. The first beam characteristic is associated with a first beamwidth, and where the second beam characteristic is associated with a second beamwidth different from the first beamwidth. The code for causing the first wireless communication device to transmit the beam configuration is configured to transmit, to the group of wireless communication devices, a beam switch command to switch from a first beam index identifying the first beam characteristic to a second beam index identifying the second beam characteristic. The non-transitory computer-readable medium may include code for causing the first wireless communication device to communicate, with the second wireless communication device, a further communication signal using the second beam characteristic based on the beam configuration. The code for causing the first wireless communication device to receive the at least one of the beam feedback information or the beam change request is configured to receive, from the second wireless communication device, a beam refinement request. The code for causing the first wireless communication device to receive the at least one of the beam feedback information or the beam change request is configured to receive, from the second wireless communication device, a beam failure recovery request. The code for causing the first wireless communication device to receive the beam failure recovery request is configured to receive the beam failure recovery request based on the beam failure recovery resource configuration. The non-transitory computer-readable medium may include code for causing the first wireless communication device to transmit, to the group of wireless communication devices, a reference signal configuration for the group of wireless communication devices. The reference signal configuration indicates at least one of channel state information-reference signal (CSI-RS) resources, CSI-RS beam characteristics, or a CSI-RS reporting configuration. The code for causing the first wireless communication device to transmit the reference signal configuration is configured to transmit, to the group of wireless communication devices, an activation for the at least one of the CSI-RS resources, the CSI-RS beam characteristics, or the CSI-RS reporting configuration. The code for causing the first wireless communication device to transmit the reference signal configuration is configured to transmit the reference signal configuration in response to the at least one of the beam feedback information or the beam change request. The non-transitory computer-readable medium may include code for causing the first wireless communication device to transmit, to the group of wireless communication devices, a plurality of reference signals, each reference signal of the plurality of reference signals transmitted using a different beam characteristic based on the reference signal configuration. The code for causing the first wireless communication device to receive the at least one of the beam feedback information or the beam change request is configured to receive the at least one of the beam feedback information or the beam change request based on one or more reference signals of the plurality of reference signals. The beam configuration is associated with the at least one of the common beam refinement or the common beam failure recovery. The code for causing the first wireless communication device to determine to form the group of wireless communication devices for the at least one of the common beam refinement or the common beam failure recovery is configured to determine to form the group of wireless communication devices for the at least one of the common beam refinement or the common beam failure recovery based on geographical location information. The code for causing the first wireless communication device to determine to form the group of wireless communication devices for the at least one of the common beam refinement or the common beam failure recovery is configured to determine to form the group of wireless communication devices for the at least one of the common beam refinement or the common beam failure recovery based on the beam feedback information. The code for causing the first wireless communication device to determine to form the group of wireless communication devices for the at least one of the common beam refinement or the common beam failure recovery is configured to determine to form the group of wireless communication devices for the at least one of the common beam refinement or the common beam failure recovery based on a network configuration. The code for causing the first wireless communication device to determine to form the group of wireless communication devices for the at least one of the common beam refinement or the common beam failure recovery is configured to determine to form the group of wireless communication devices for the at least one of the common beam refinement or the common beam failure recovery based on environmental information. The non-transitory computer-readable medium may include code for causing the first wireless communication device to select the second wireless communication device from among the group of wireless communication devices as an anchor for a common beam refinement or a common beam failure recovery for the group of wireless communication devices based on at least one of a wake-up-sleep cycle of the second wireless communication device, a capability the second wireless communication device, or a transmission payload size associated with the second wireless communication device; and code for causing the first wireless communication device to transmit, to the second wireless communication device, an anchor configuration to configure the second wireless communication device as the anchor for the common beam refinement or the common beam failure recovery. The code for causing the first wireless communication device to communicate the communication signal is configured to communicate, with the second wireless communication device, the communication signal in a millimeter wave (mmWave) frequency band. The first wireless communication device is a base station (BS), and where the second wireless communication device is a user equipment (UE) or a customer premise equipment (CPE). Each of the first wireless communication device and the second wireless communication device is a user equipment (UE) or a customer premise equipment (CPE). The second wireless communication device is an internet of thing (IoT) device.

Further aspects of the present disclosure include an apparatus including means for communicating, with a first wireless communication device of a group of wireless communication devices, a communication signal using a first beam characteristic. The apparatus also includes means for receiving, from the first wireless communication device, at least one of beam feedback information or a beam change request. The apparatus also includes means for transmitting, to the group of wireless communication devices in response to the at least one of the beam feedback information or the beam change request, a beam configuration indicating a second beam characteristic to be used by the group of wireless communication devices for communicating with the apparatus, the second beam characteristic being different from the first beam characteristic.

The apparatus may also include one or more of the following features. For instance, the apparatus may include where the first beam characteristic is associated with a first beam direction, and where the second beam characteristic is associated with a second beam direction different from the first beam direction. The first beam characteristic is associated with a first beamwidth, and where the second beam characteristic is associated with a second beamwidth different from the first beamwidth. The means for transmitting the beam configuration is configured to transmit, to the group of wireless communication devices, a beam switch command to switch from a first beam index identifying the first beam characteristic to a second beam index identifying the second beam characteristic. The apparatus may include means for communicating, with the first wireless communication device, a further communication signal using the second beam characteristic based on the beam configuration. The means for receiving the at least one of the beam feedback information or the beam change request is configured to receive, from the first wireless communication device, a beam refinement request. The means for receiving the at least one of the beam feedback information or the beam change request is configured to receive, from the first wireless communication device, a beam failure recovery request. The means for receiving the beam failure recovery request is configured to receive the beam failure recovery request based on the beam failure recovery resource configuration. The apparatus may include means for transmitting, to the group of wireless communication devices, a reference signal configuration for the group of wireless communication devices. The reference signal configuration indicates at least one of channel state information-reference signal (CSI-RS) resources, CSI-RS beam characteristics, or a CSI-RS reporting configuration. The means for transmitting the reference signal configuration is configured to transmit, to the group of wireless communication devices, an activation for the at least one of the CSI-RS resources, the CSI-RS beam characteristics, or the CSI-RS reporting configuration. The means for transmitting the reference signal configuration is configured to transmit the reference signal configuration in response to the at least one of the beam feedback information or the beam change request. The apparatus may include means for transmitting, to the group of wireless communication devices, a plurality of reference signals, each reference signal of the plurality of reference signals transmitted using a different beam characteristic based on the reference signal configuration. The means for receiving the at least one of the beam feedback information or the beam change request is configured to receive the at least one of the beam feedback information or the beam change request based on one or more reference signals of the plurality of reference signals. The beam configuration is associated with the at least one of the common beam refinement or the common beam failure recovery. The means for determining to form the group of wireless communication devices for the at least one of the common beam refinement or the common beam failure recovery is configured to determine to form the group of wireless communication devices for the at least one of the common beam refinement or the common beam failure recovery based on geographical location information. The means for determining to form the group of wireless communication devices for the at least one of the common beam refinement or the common beam failure recovery is configured to determine to form the group of wireless communication devices for the at least one of the common beam refinement or the common beam failure recovery based on the beam feedback information. The means for determining to form the group of wireless communication devices for the at least one of the common beam refinement or the common beam failure recovery is configured to determine to form the group of wireless communication devices for the at least one of the common beam refinement or the common beam failure recovery based on a network configuration. The means for determining to form the group of wireless communication devices for the at least one of the common beam refinement or the common beam failure recovery is configured to determine to form the group of wireless communication devices for the at least one of the common beam refinement or the common beam failure recovery based on environmental information. The apparatus may include means for selecting the first wireless communication device from among the group of wireless communication devices as an anchor for a common beam refinement or a common beam failure recovery for the group of wireless communication devices based on at least one of a wake-up-sleep cycle of the first wireless communication device, a capability the first wireless communication device, or a transmission payload size associated with the first wireless communication device; and means for transmitting, to the first wireless communication device, an anchor configuration to configure the first wireless communication device as the anchor for the common beam refinement or the common beam failure recovery. The means for communicating the communication signal is configured to communicate, with the first wireless communication device, the communication signal in a millimeter wave (mmWave) frequency band. The apparatus is a base station (BS), and where the first wireless communication device is a user equipment (UE) or a customer premise equipment (CPE). Each of the apparatus and the first wireless communication device is a user equipment (UE) or a customer premise equipment (CPE). The first wireless communication device is an internet of thing (IoT) device.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
   communicating, by a first wireless communication device with a second wireless communication device of a group of wireless communication devices, a communication signal using a first beam characteristic associated with a first beamwidth granularity;
   receiving, by the first wireless communication device from the second wireless communication device, at least one of beam feedback information or a beam change request; and
   transmitting, by the first wireless communication device to the group of wireless communication devices in response to the at least one of the beam feedback information or the beam change request, a beam configuration indicating a second beam characteristic associated with a second beamwidth granularity to be used by the group of wireless communication devices for communicating with the first wireless communication device, the second beam characteristic being different from the first beam characteristic.

2. The method of claim 1, wherein the first beam characteristic is associated with at least one of a first beam direction or a first beamwidth, and wherein the second beam characteristic is associated with at least one of a second beam direction different from the first beam direction or a second beamwidth different from the first beamwidth.

3. The method of claim 1, wherein the transmitting the beam configuration includes:
   transmitting, by the first wireless communication device to the group of wireless communication devices, a beam switch command to switch from a first beam index identifying the first beam characteristic to a second beam index identifying the second beam characteristic.

4. The method of claim 1, further comprising:
   communicating, by the first wireless communication device with the second wireless communication device, a further communication signal using the second beam characteristic based on the beam configuration.

5. The method of claim 1, wherein the receiving includes:
   receiving, by the first wireless communication device from the second wireless communication device, at least one a beam refinement request or a beam failure recovery request.

6. The method of claim 1, further comprising:
   transmitting, by the first wireless communication device to the group of wireless communication devices, a beam failure recovery resource configuration for the group of wireless communication devices,
   wherein the receiving includes:
   receiving, by the first wireless communication device from the second wireless communication device, a beam failure recovery request based on the beam failure recovery resource configuration.

7. The method of claim 1, further comprising:
   transmitting, by the first wireless communication device to the group of wireless communication devices, a reference signal configuration for the group of wireless communication devices, wherein the reference signal configuration indicates at least one of channel state information-reference signal (CSI-RS) resources, CSI-RS beam characteristics, or a CSI-RS reporting configuration.

8. The method of claim 7, wherein the transmitting the reference signal configuration includes:
   transmitting, by the first wireless communication device to the group of wireless communication devices, an activation for the at least one of the CSI-RS resources, the CSI-RS beam characteristics, or the CSI-RS reporting configuration.

9. The method of claim 7, wherein the transmitting the reference signal configuration is in response to the at least one of the beam feedback information or the beam change request.

10. The method of claim 7, further comprising:
    transmitting, by the first wireless communication device to the group of wireless communication devices, a plurality of reference signals, each reference signal of the plurality of reference signals transmitted using a different beam characteristic based on the reference signal configuration,
    wherein the receiving the at least one of the beam feedback information or the beam change request is based on one or more reference signals of the plurality of reference signals.

11. The method of claim 1, further comprising:
    determining, by the first wireless communication device, to form the group of wireless communication devices for at least one of a common beam refinement or a common beam failure recovery,
    wherein the beam configuration is associated with the at least one of the common beam refinement or the common beam failure recovery.

12. The method of claim 11, wherein the determining to form the group of wireless communication devices for the at least one of a common beam refinement or a common beam failure recovery is based on at least one of geographical location information, the beam feedback information, a network configuration, or environmental information.

13. The method of claim 11, further comprising:
    selecting, by the first wireless communication device, the second wireless communication device from among the group of wireless communication devices as an anchor for a common beam refinement or a common beam failure recovery for the group of wireless communication devices based on at least one of a wake-up-sleep cycle of the second wireless communication device, a capability the second wireless communication device, or a transmission payload size associated with the second wireless communication device; and
    transmitting, by the first wireless communication device to the second wireless communication device, an anchor configuration to configure the second wireless communication device as the anchor for the common beam refinement or the common beam failure recovery.

14. The method of claim 1, wherein the first wireless communication device is a base station (BS), and wherein the second wireless communication device is a user equipment (UE) or a customer premises equipment (CPE).

15. The method of claim 1, wherein each of the first wireless communication device and the second wireless communication device is a user equipment (UE) or a customer premises equipment (CPE).

16. An apparatus comprising:
a transceiver configured to:
communicate, with a first wireless communication device of a group of wireless communication devices, a communication signal using a first beam characteristic associated with a first beamwidth granularity;
receive, from the first wireless communication device, at least one of beam feedback information or a beam change request; and
transmit, to the group of wireless communication devices in response to the at least one of the beam feedback information or the beam change request, a beam configuration indicating a second beam characteristic associated with a second beamwidth granularity to be used by the group of wireless communication devices for communicating with the apparatus, the second beam characteristic being different from the first beam characteristic.

17. The apparatus of claim 16, wherein the transceiver configured to transmit the beam configuration is configured to:
transmit, to the group of wireless communication devices, a beam switch command to switch from a first beam index identifying the first beam characteristic to a second beam index identifying the second beam characteristic.

18. The apparatus of claim 16, wherein the transceiver is further configured to:
communicate, with the first wireless communication device, a further communication signal using the second beam characteristic based on the beam configuration.

19. The apparatus of claim 16, wherein the transceiver configured to receive the at least one of the beam feedback information or the beam change request is configured to:
receive, from the first wireless communication device, at least one of a beam refinement request or a beam failure recovery request.

20. The apparatus of claim 16, wherein the transceiver is further configured to:
transmit, to the group of wireless communication devices, a reference signal configuration for the group of wireless communication devices, wherein the reference signal configuration indicates at least one of channel state information-reference signal (CSI-RS) resources, CSI-RS beam characteristics, or a CSI-RS reporting configuration.

21. The apparatus of claim 16, further comprising:
a processor configured to determine to form the group of wireless communication devices for at least one of a common beam refinement or a common beam failure recovery,
wherein the beam configuration is associated with the at least one of the common beam refinement or the common beam failure recovery.

22. The apparatus of claim 21, wherein the processor configured to determine to form the group of wireless communication devices for the at least one of the common beam refinement or the common beam failure recovery is configured to:
determine to form the group of wireless communication devices for the at least one of the common beam refinement or the common beam failure recovery based on at least one of geographical location information, the beam feedback information, a network configuration, or environmental information.

23. The apparatus of claim 21, wherein:
the processor is further configured to:
select the first wireless communication device from among the group of wireless communication devices as an anchor for a common beam refinement or a common beam failure recovery for the group of wireless communication devices based on at least one of a wake-up-sleep cycle of the first wireless communication device, a capability the first wireless communication device, or a transmission payload size associated with the first wireless communication device; and
the transceiver is further configured to:
transmit, to the first wireless communication device, an anchor configuration to configure the first wireless communication device as the anchor for the common beam refinement or the common beam failure recovery.

24. A non-transitory computer-readable medium having program code recorded thereon, the program code comprising:
code for causing a first wireless communication device to communicate, with a second wireless communication device of a group of wireless communication devices, a communication signal using a first beam characteristic associated with a first beamwidth granularity;
code for causing the first wireless communication device to receive, from the second wireless communication device, at least one of beam feedback information or a beam change request; and
code for causing the first wireless communication device to transmit, to the group of wireless communication devices in response to the at least one of the beam feedback information or the beam change request, a beam configuration indicating a second beam characteristic associated with a second beamwidth granularity to be used by the group of wireless communication devices for communicating with the first wireless communication device, the second beam characteristic being different from the first beam characteristic.

25. The non-transitory computer-readable medium of claim 24, wherein the code for causing the first wireless communication device to transmit the beam configuration is configured to:
transmit, to the group of wireless communication devices, a beam switch command to switch from a first beam index identifying the first beam characteristic to a second beam index identifying the second beam characteristic.

26. The non-transitory computer-readable medium of claim 24, further comprising:
code for causing the first wireless communication device to communicate, with the second wireless communication device, a further communication signal using the second beam characteristic based on the beam configuration.

27. The non-transitory computer-readable medium of claim 24, wherein the code for causing the first wireless communication device to receive the at least one of the beam feedback information or the beam change request is configured to:

receive, from the second wireless communication device, at least one of a beam refinement request or a beam failure recover request.

28. The non-transitory computer-readable medium of claim 24, further comprising:

code for causing the first wireless communication device to transmit, to the group of wireless communication devices, a reference signal configuration for the group of wireless communication devices, wherein the reference signal configuration indicates at least one of channel state information-reference signal (CSI-RS) resources, CSI-RS beam characteristics, or a CSI-RS reporting configuration.

29. The non-transitory computer-readable medium of claim 24, further comprising:

code for causing the first wireless communication device to determine to form the group of wireless communication devices for at least one of a common beam refinement or a common beam failure recovery, wherein the beam configuration is associated with the at least one of the common beam refinement or the common beam failure recovery.

30. An apparatus comprising:

means for communicating, with a first wireless communication device of a group of wireless communication devices, a communication signal using a first beam characteristic associated with a first beamwidth granularity;

means for receiving, from the first wireless communication device, at least one of beam feedback information or a beam change request; and means for transmitting, to the group of wireless communication devices in response to the at least one of the beam feedback information or the beam change request, a beam configuration indicating a second beam characteristic associated with a second beamwidth granularity to be used by the group of wireless communication devices for communicating with the apparatus, the second beam characteristic being different from the first beam characteristic.

\* \* \* \* \*